(12) United States Patent
Xiong

(10) Patent No.: US 7,376,274 B2
(45) Date of Patent: May 20, 2008

(54) METHOD AND APPARATUS FOR USE IN VIDEO SEARCHING

(75) Inventor: Wei Xiong, Fremont, CA (US)

(73) Assignee: Sonic Solutions, Novato, CA (US)

( * ) Notice: Subject to any disclaimer, the term of this patent is extended or adjusted under 35 U.S.C. 154(b) by 127 days.

(21) Appl. No.: 10/931,612

(22) Filed: Aug. 31, 2004

(65) Prior Publication Data
US 2006/0048191 A1 Mar. 2, 2006

(51) Int. Cl.
G06K 9/68 (2006.01)
G06K 9/34 (2006.01)

(52) U.S. Cl. ........................ 382/218; 382/173

(58) Field of Classification Search ............ 707/4; 358/450; 386/49, 69
See application file for complete search history.

(56) References Cited

U.S. PATENT DOCUMENTS

| | | | |
|---|---|---|---|
| 5,459,517 A | | 10/1995 | Kunitake et al. |
| 5,838,837 A | * | 11/1998 | Hirosawa et al. ........... 382/284 |
| 5,917,990 A | | 6/1999 | Zamara et al. |
| 5,956,026 A | | 9/1999 | Ratakonda |
| 6,014,183 A | | 1/2000 | Hoang |
| 6,389,179 B1 | * | 5/2002 | Katayama et al. .......... 382/284 |
| 6,400,890 B1 | * | 6/2002 | Nagasaka et al. ............. 386/69 |
| 6,411,742 B1 | * | 6/2002 | Peterson .................... 382/284 |
| 6,952,697 B1 | | 10/2005 | Rothschild |

OTHER PUBLICATIONS

Eung Kwan Kang; Sung Joo Kim; Jong Soo Choi, "Video retrieval based on key frame extraction in compressed domain ," Image Processing, 1999. ICIP 99. Proceedings. 1999 International Conference on , vol. 3, No. pp. 260-264 vol. 3, 1999.*

S.F. Chang, W. Chen, H.J. Meng, H. Sundaram, and D. Zhong, "VideoQ: An Automated Content Based Video Search System☐☐Using Visual Cues," Proc. ACM Multimedia, pp. 313-324, 1997.*

A. K. Jain, A.Vailaya, andW. Xiong. "Query by video clip," Multimedia Syst., 1999.*

W. Xiong, J. C. M. Lee, and R. H. Ma, Automatic video data structuring☐☐through shot partitioning and key frame selection, Machine Vision Appl.☐☐10, 1997, 51-65.*

(Continued)

Primary Examiner—Brian Werner
Assistant Examiner—Hadi Akhavannik
(74) Attorney, Agent, or Firm—Fitch, Even, Tabin & Flannery

(57) ABSTRACT

The present embodiments provide methods and apparatuses for use in searching and/or retrieving video data. Some embodiments provide method for use in searching video data, that extract a spatiotemporal representation of at least a portion of a query sequence of video data, produce a query slice image from the spatiotemporal representation of the at least the portion of the query sequence, extract a spatiotemporal representation of at least a portion of candidate video data, produce a candidate slice image from the spatiotemporal representation of the at least the portion of the candidate video data, and determine when the query slice image matches at least a portion of the candidate slice image. In some embodiments, an apparatus is provided for use with video data. The apparatus comprises a memory storing candidate video data and a query sequence, a slice generator and a two-dimensional image generator.

21 Claims, 14 Drawing Sheets

OTHER PUBLICATIONS

S-F. Chang, J.R Smith, M. Beigi, and A. Benitez. Visual Information retrieval from large distributed online repositories.☐☐Gmmunications of theACM, 4012, pp. 6M7, 1997.*

Xiong, Lee and Ma, "Automatic Video Data Structuring through Shot Partitioning and Key=Frame Computing," Machine Vision and Applications, 1997, pp. 51-65, vol. 10, issue 2.

Duygulu, Chen and Hauptmann, "Comparison and Combination of Two Novel Commercial Detection Methods," To Appear in Processing International Conference on Multimedia and Expo (ICME), Jun. 2004.

Faloutsos, Barber, Flickner, Niblack, Petkovic and Equitz, "Efficient and Effective Querying by Image Content," J. of Intelligent Information Systems, Jul. 1994, 3 (3/4):231-26.

Cheung and Zakhor, "Efficient Video Similarity Measurement and Search," International Conference on Image Processing, Sep. 2000, pp. 85-89, vol. I.

Browne, Smeation, Murphy, O'Conner, Marlow and Berrut, "Evaluating and Combining Digital Video Shot Boundary Detection Algorithms." In Proceedings of the Fourth Irish Machine Vision and Information Processing Conference, Sep. 1999, Queens University Belfast.

Rui, Huang and Chang, "Image Retrieval: Current Techniques, Promising Directions and Open Issues," Journal of Visual Communication and Image Representation, Apr. 1999, pp. 39-62, vol. 10, No. 4.

Jain, Vailaya and Xiong, "Query by Video Clip," Multimedia Systems Journal: Special Issue on Video Libraries, 1999, pp. 369-384, vol. 7, No. 5.

Petrakis and Faloutsos, "Similarity Searching in Medical Image Databases," IEEE TKDE, May/Jun. 1997, pp. 435-447, vol. 9, No. 3.

Zhong and Chang, "Spatio-Temporal Video Search Using the Object Based Video Representation," International Conference on Image Processing (ICIP), 1997.

Patel and Sethi, "Video Shot Detection and Characterization for Video Databases," Pattern Recognition, Apr. 1997, pp. 583-592, vol. 30, No. 4.

Smith and Chang, "VisualSEEk: A Fully Automated Content-Based Image Query System," In Proceedings of ACM Multimedia 96, 1996, pp. 87-89, Boston, MA.

Gargi, Kasturi and Strayer, "Performance Characterization of Video-Shot-Change Detection Methods," IEEE Transactions on Circuits and Systems for Video Technology, Feb. 2000, pp. 1-13, vol. 10, No. 1.

Ford et al., "Metrics for Scene Change Detection in Digital Video Sequences," IEEE International Conference on Multimedia Computing and Systems, Jul. 3-6, 1997, Ottawa, Ontario, Canada.

PCT International Report on Patentability, for corresponding PCT Application No. PCT/US2005/031106, Date of Mailing: Mar. 8, 2007, 7 pages.

* cited by examiner

METHOD AND APPARATUS FOR USE IN VIDEO SEARCHING

FIELD OF THE INVENTION

The present invention relates generally to accessing video data and more specifically searching video data.

BACKGROUND

There are many reasons and benefits for searching video content. For example, by searching video content, defined content can be identified, retrieved, skipped, edited, eliminated, and allows other functions to be performed with the identified data. Similarly, the commercial and private applications for searching video content are numerous.

The amount of data associated with video data is typically very large. For example, a frame of video data can contain about 2 Mbytes of data or more. A video often has as many as 30 frames or more per second of play time. This amount of data rapidly becomes extremely large. With such large amounts of data, searching becomes extremely computationally expensive, often slow, and typically not implemented in real time.

Some search techniques suggest ways of reducing the data and searching less than all of the data. These techniques, however, often result in inaccurate results. Further, the selection of which content to search can often by subjective, further resulting in inconsistent results. Therefore, many of these techniques fail to provide accurate and consistent results.

SUMMARY OF THE EMBODIMENT

The present invention advantageously addresses the needs above as well as other needs through the provision of the method, apparatus, and system for use in searching video, multimedia and other content and/or data. In some embodiments, a method is provided that extracts a spatiotemporal representation of at least a portion of a query sequence of video data, and produces a query slice image from the spatiotemporal representation of the at least the portion of the query sequence. The method further extracts a spatiotemporal representation of at least a portion of candidate video data, and produces a candidate slice image from the spatiotemporal representation of the at least the portion of the candidate video data. These images are utilized by the method to determine when the query slice image matches at least a portion of the candidate slice image.

Some embodiments provide a method for use in searching video data. This method extracts a query slice of query data from each of a plurality of frames of a query sequence of video data, and generates a two-dimensional query slice image from the extracted query slice data. A candidate slice of candidate data is further extracted from each of a plurality of frames of a candidate sequence of video data, and a two-dimensional candidate slice image is generated from the extracted candidate data. The method then compares the query slice image and the candidate slice image.

An apparatus for use with video data is provided in some embodiments. The apparatus includes a memory that stores candidate video data comprising a plurality of frames, and a query sequence comprising a plurality of frames. A slice generator is further provided coupled with the memory to retrieve at least a portion of the candidate video data and the query sequence. The slice generator extracts a candidate slice of candidate data from a plurality of the frames of the candidate video data, and further extracts a query slice of candidate date from a plurality of the frames of the query sequence. A two-dimensional image generator is further included in the apparatus and coupled to receive the candidate slices and the query slices, and generates a candidate slice image and a query slice image.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present embodiments will be more apparent from the following more particular description thereof, presented in conjunction with the following drawings wherein.

Figure 1:
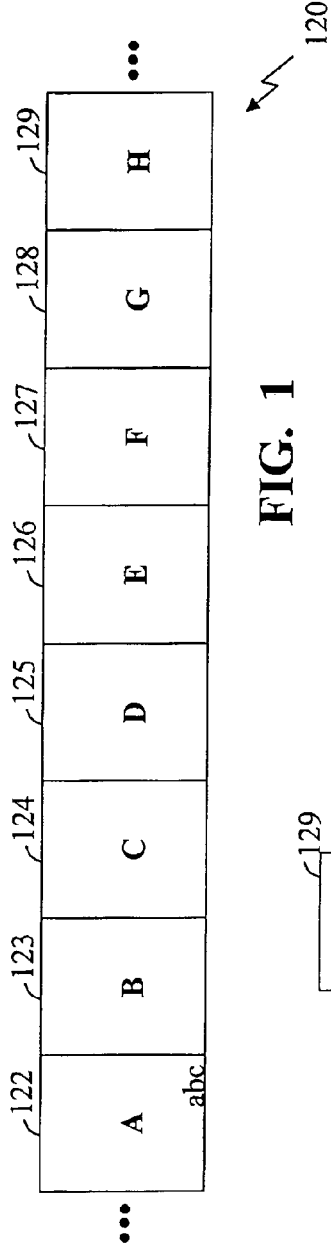
FIG. 1 depicts a simplified block diagram of a series of sequential video frames of a portion of a video clip.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods and systems for use in searching video, multimedia and other image data. The embodiments are described below with reference to video data to simplify the description, however, the present embodiments are not limited to video data, but can be equally applied to many applications including but not limited to searching groups of still images, scene matching and searching, controlling recording and/or playback of video data (e.g., used with personal video recorder (PVR), digital video recorder (DVR) and other such systems to implement controls on the system such as skipping ahead or back to find beginning and/or end a block of commercials), identifying the origin of portions or snippets of video (sometimes referred to a fingerprinting), coordinating a video library, and other such functions and operations as would be understood by one skilled in the art.

Video data searching can be viewed in some instances as being analogous to key word searching in text data. The searching of video content allows users to identify desired video content and retrieve, skip, edit, eliminate, and/or perform other functions with the identified data. Similarly, video searching can be utilized to enhance video compression, digital video disc (DVD) appropriation, commercial detection, DVD chapter point creation, retail outlets can utilize the search to locate video data being sought by a customer, and other similar applications.

The ability to search video data provides many benefits. The amount of data associated with videos and/or other multimedia content, however, often limits the ability to accurately search video content, requires large amounts of time, and/or can be computationally demanding. Typically, with video searching, the amount of data than needs to be evaluated is extremely large. For example, under some standards (e.g., National Television System(s) Committee (NTSC) standard), the video content consist of about 30 interlaced frames of video for every second, where each frame further consisting, for example, of 480×520 pixels, and each pixel can be defined by three bytes of data. One hour of video data consists, for example with NTSC, of 107,892 frames, with frame comprising at least about 749 Kbytes of data. Other video standards (e.g., Phase Alternating Line (PAL), high-definition, and the like) have other data criteria, but include similar amounts of data. Therefore, to perform a video search of all of the content data is typically computationally prohibitive.

Many methods and theories have been proposed or developed to try and provide accurate video searching. These methods, however, typically do not adequately solve the computationally demanding dilemma, are often inaccurate because of attempts to reduce the excessive computational processing, and/or have limited applicability.

For example, some search methods detect image/video features (e.g., color features, motion features, or some act information, shape of object information, shape information, and many other various features), and use the differences between features for video comparison. Typically, these methods utilize larges amounts of computational processing to identify the features, because there are so many frames, and further computation processing to search video. The results obtained through feature comparison are often flawed and unreliable. Further, simple feature detection is typically still computational expensive when the detection is applied on all and/or a large percentage of the frames in video.

Other methods of searching video identify key frames in a video clip that are trying to be found, and/or in video data being searched. Key frame selection, however, is generally very subjective. The identifying of key frames can be based on many different criteria, and these criteria are often themselves subjective. As such, different reasoning may be employed for selecting key frames for similar video clips, resulting in different sets of key frames for the similar video clips. These different sets of key frames, further results in different sets of features and searching results may be different for different searching. Additionally, the amount of data associated with key frame processing is often still computationally expensive because of the numbers of key frames needed to better ensure accurate searching. Some methods attempt to reduce the computation processing by utilizing the key frames, and further identifying features within the frame (e.g., shapes, background, color feature, RGB color). However, the subjective selection of key frames can still result in different search results.

Key frames are often selected by initially performing some shot detection to identify different shots and/or transitions in a video sequence. Shot detection typically defines shot boundaries through the detection of changes in scenes. Once shots are identified the first frame or last frame are often selected as the key frame. Other frames, such as a frame in the middle might in some instances be selected as a key frame. The selection of key frame as indicated above is ultimately some what subjective.

Because of the limited number of frames selected and/or because some frames are not selected, the use of key frames is inherently a source of error. Further, if too many key frames are selected, the searching can still be computationally costly and/or prohibitive. Alternatively, if too few key frames are selected, there may not be enough representative information to achieve an accurate search. As a result, when a search is conducted with too few key frames, the search may not identify the one occurrence or all of the occurrences of the data attempting to be found. Further, key frame selection often requires a significant amount of training to implement searching. A user must understand how key frames are selected, how to evaluate the criteria and/or features to use for selecting the frames, and in some implementations, an understanding of the algorithms used in selecting frames.

As such, key frame selection is very subjective and often allows for inconsistent key frames. Further, the use of key frames introduces inherent errors because a few frames are used to represent an entire clip and other information is inherently missing. If too many key frames are use, information is redundant, resulting excessive data volumes and excessive computational processing.

The present embodiments utilize spatial and temporal methods to evaluate query video data, and video data to be search (candidate data) to identify whether the candidate data includes the query data. In part, the present embodiments provide for efficient and effective video data searching. In some preferred embodiments, spatiotemporal representations and/or slice data is utilized (as fully described below) to measure the similarity and/or dissimilarity of video data and/or clips. The methods and systems provided through the present embodiments further allow real time video searching due, in many implementations, to the reduced computational processing and simplified analysis.

Video data is typically defined by multiple frames of data. FIG. 1 depicts a simplified block diagram of a series 120 of sequential video frames 122-129 of a portion of a video clip (the entire clip is not represented). The frames when displayed, for example on a computer monitor, television and the like, depict graphical data. As a simplified example, the sequence of frames is shown with each frame depicting consecutive alphabetic characters, A, B, C, . . . H, to demonstrate the change in frames. Frames of video data, however, typically include much more information than a single character, and further, the images associated with successive frames often do not include such rapid and frequent changes. For simplicity and aid of description, the frames 122-129 of FIG. 1 are depicted with the single alphabetic character. The data defining each frame comprises a plurality of pixel data. In some embodiments, the pixels are defined by color and luminance data, however, pixels can be defined by other data as is known in the art.

Each frame 122-129 can be viewed as two dimensional (2-D) data (X, and Y). The sequence of frames represent a three dimensional (3-D) volume of data with two spatial (image) dimensions (X, Y) and a temporal dimension (t). The present embodiments define a representation of the three dimensional characterization of the series of frames. In some preferred embodiments, a portion of data defined by X and Y parameters extending across at least a portion of a frame is extracted from each frame at the same X and Y parameters. The portion of the data extracted from a frame can be viewed as a two dimensional slice of data for that frame.

Figure 2:
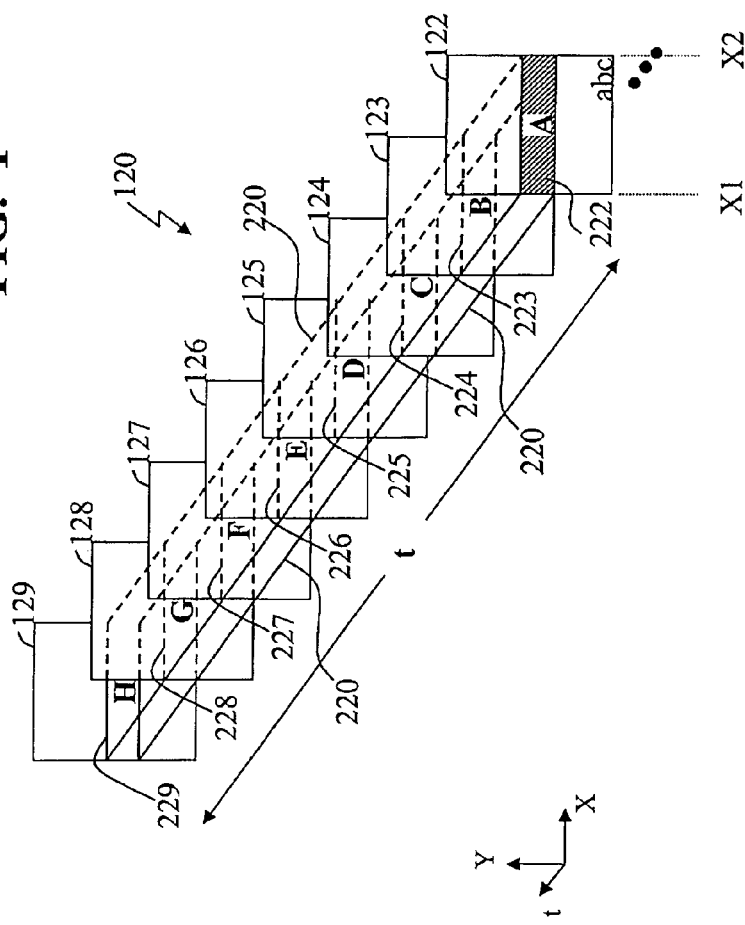
FIG. 2 depicts the series or sequence of frames of FIG. 1 with a two dimensional slice defined across the first frame.

FIG. 2 depicts the series or sequence 120 of frames 122-129 of FIG. 1 with a two dimensional slice 222 defined across the first frame 122. The slice is defined by X and Y parameters (e.g., X1, X2, and Y1, Y2) relative to the frame 122. The third dimension of the representation of the series of frames is based on time t, by extending the defined slice 222 over time t to successive frames, thus defining a spatiotemporal slice or sheet 220 through the series 120 of frames 122-129.

Figure 3:
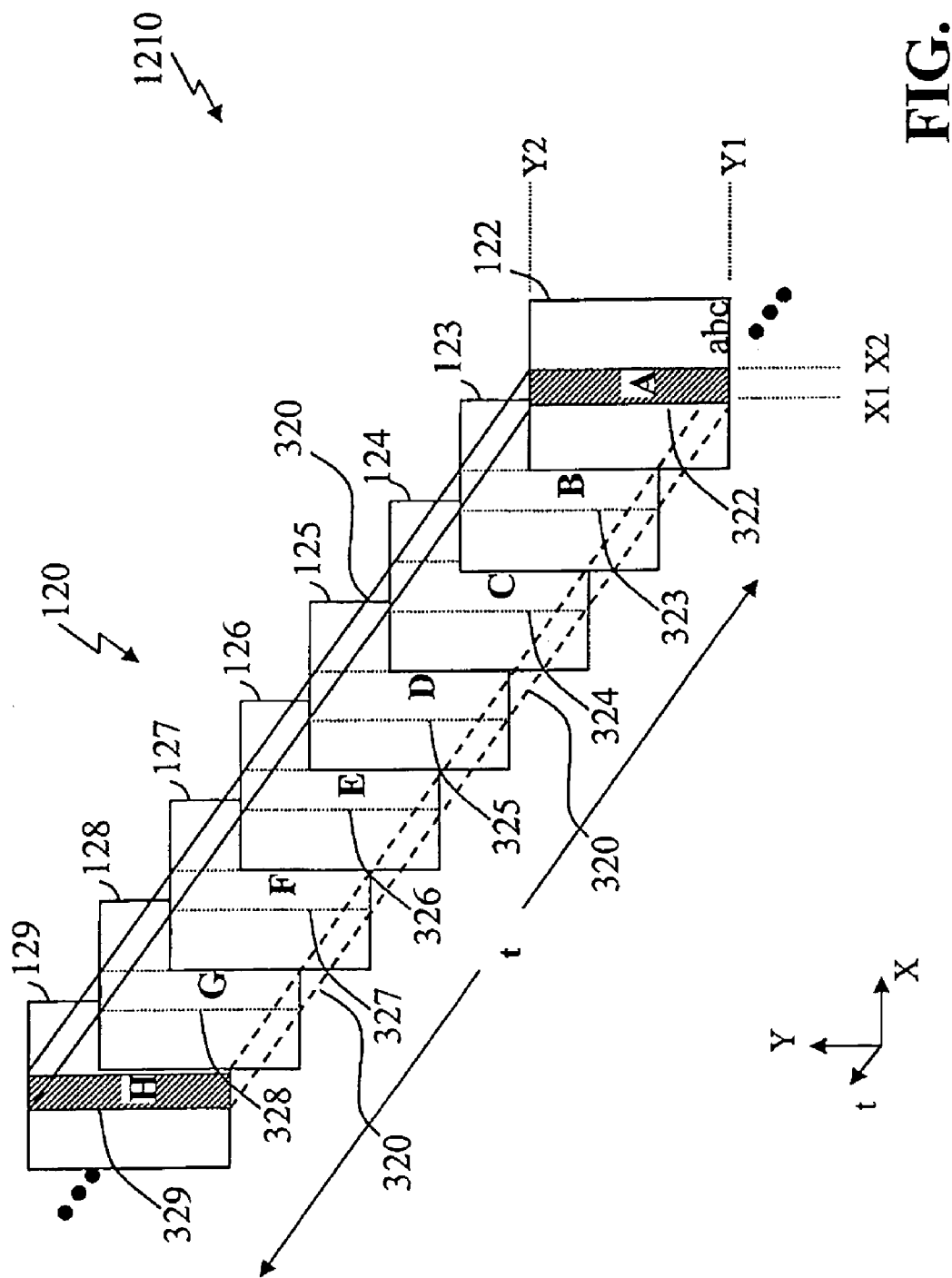
FIG. 3 depicts a simplified block diagram of a series or sequence of frames of FIG. 1 with a vertical spatiotemporal slice represented and defined by vertical slices within each frame.

The spatiotemporal slice 220 shown in FIG. 2 is a horizontal slice consists of horizontal slices 222-229 along the X axis (X1, X2) through each frame with width defined along the Y axis (Y1, Y2). The slice 222, however, can be substantially any slice across the frames. For example, vertical, diagonal, any strait lined slice, curved slices, triangular slices, circular slices, spiral slices, multiple spaced apart slices or pieces, and substantially any relevant sliced extraction of data can be extracted from the frame data to define the spatiotemporal representation. FIG. 3 depicts a simplified block diagram of a series or sequence 120 of frames 122-129 of FIG. 1 with vertical slices 322-329 defined along the Y axis (Y1, Y2) with a width defined along the X axis (X1, X2). A spatiotemporal vertical slice 320 defined by extending the vertical slice 322 across each of the frames. Further, the size of the slice can depend on the amount of data associated with the series of frames, the amount of data to be search and other similar factors. Typically, relatively small slices are extracted from each frame and utilized together where the changes in the frames over the series of frames are used in searching.

Figure 5:
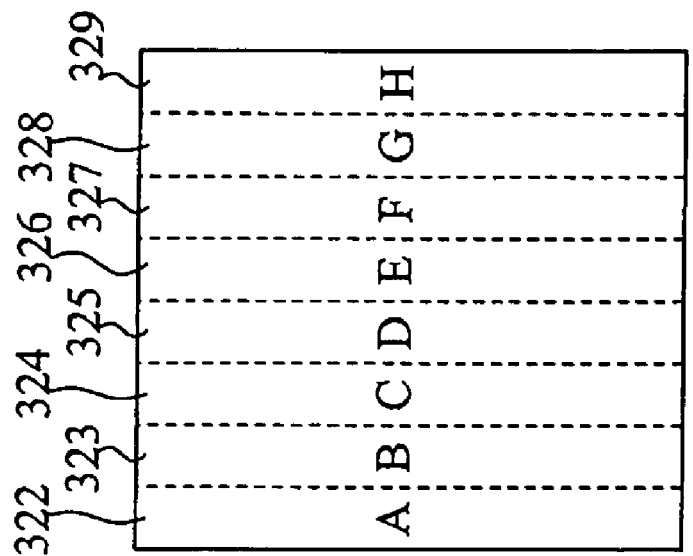
FIG. 5 depicts a simplified block diagram of a vertical two-dimensional spatiotemporal slice representation or image of concatenated vertical slices from each frame of the series of FIGS. 1 and 3.
Figure 4:
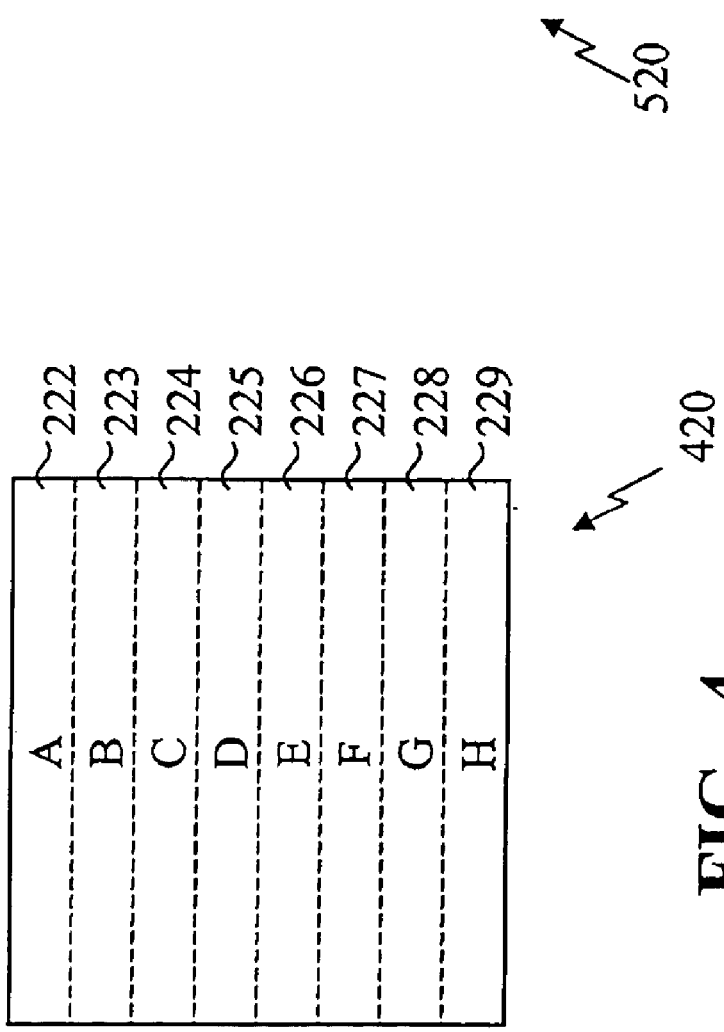
FIG. 4 depicts a simplified block diagram of a two dimensional spatiotemporal slice representation or image of the series 120 of FIGS. 1 and 2.

Some preferred embodiments utilize the slice data from a plurality of frames and/or every frame and concatenate the slice data to define a two-dimensional spatiotemporal representation or image of the three dimensional series 120. FIG. 4 depicts a simplified block diagram of a two dimensional spatiotemporal slice representation or image 420 of the series 120 of FIGS. 1 and 2. The two-dimensional spatiotemporal image 420 shown in FIG. 4 is defined as a horizontal spatiotemporal slice representation by concatenating the horizontal slices 222-229 extracted from a plurality of and/or from each frame 122-129 of FIG. 2. FIG. 5 depicts a simplified block diagram of a vertical two-dimensional spatiotemporal slice representation or image 520 of concatenated vertical slices 322-329 from each frame 122-129 of the series 120 of FIGS. 1 and 3. By concatenating the slice data into a single image, the three-dimensional sequence 120 is represented by a static two-dimensional image 420, 520. The present embodiments, utilize the generated two-dimensional static slice images in searching video content, by reducing the searching to a simplified image comparison. In some preferred embodiments, two-dimensional static slice images are generated for both query data and candidate date. Thus, the comparison of query to candidate data is reduced to image comparisons.

Figures 6, 7:
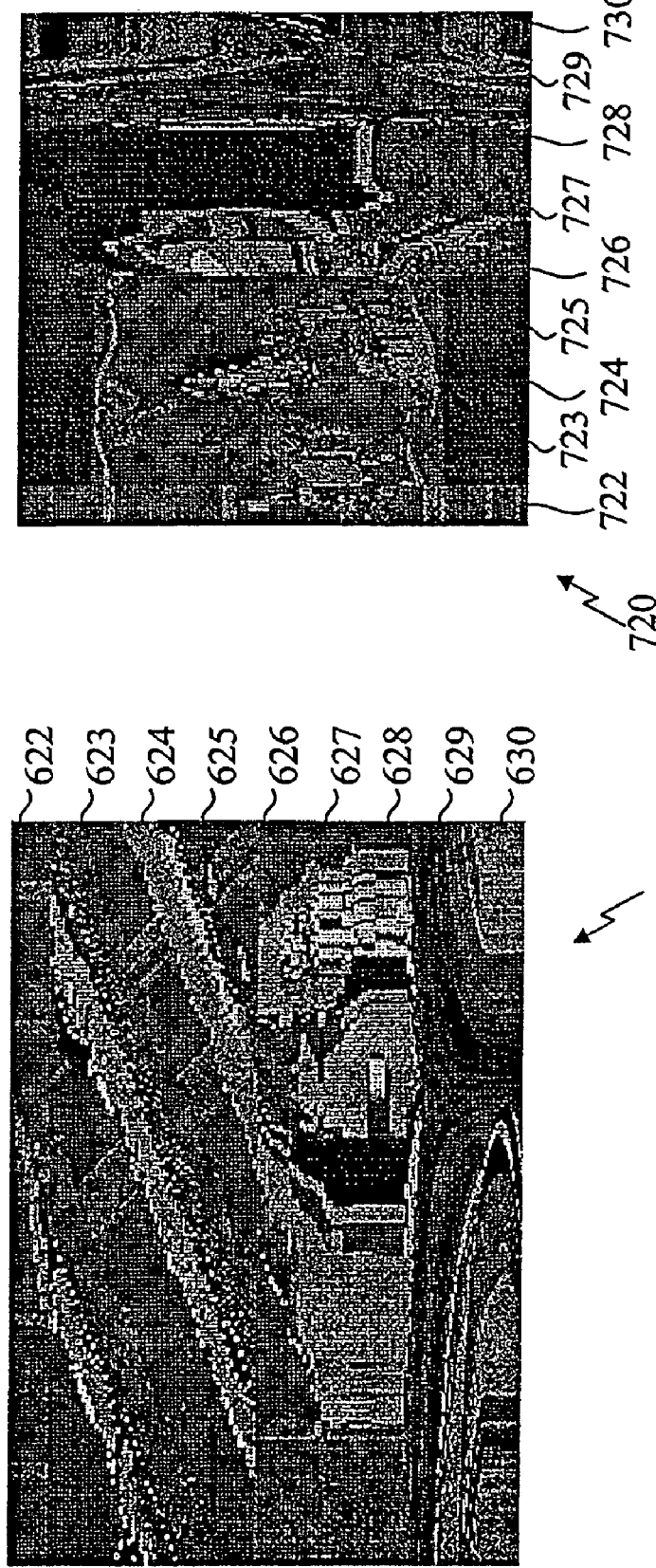
FIG. 6 depicts a pictorial representation of a horizontal slice image representation of a graphical video sequence of a series of frames, defined by the slices extracted from a plurality of frames.
FIG. 7 depicts a pictorial representation of a vertical slice image representation of a video sequence of a series of frames, defined by the slices from a plurality of frames.

FIG. 6 depicts a pictorial representation of a horizontal slice image representation 620 of a graphical video sequence of a series of frames, defined by the slices 622-630 extracted from a plurality of frames, and typically from each frame of the series. As discussed above, the slices 622-630 are concatenated to define a two-dimensional slice image representation 620 of the video sequence. FIG. 7 depicts a pictorial representation of a vertical slice image representation 720 of a video sequence of a series of frames, defined by the slices 722-732 from each frame.

The two-dimensional spatiotemporal slice images (e.g., image 420, 520) are utilized in the present embodiments to define spatiotemporal representation of query video data. Similarly, in some embodiments, one or more two-dimensional spatiotemporal slice images of one or more portions of candidate video data to be searched are also generated. By representing both the query data and the candidate data by two-dimensional spatiotemporal images (e.g., horizontal slice images), the two-dimensional query slice image and candidate slice image can be compared. For example, in some embodiments, the comparison is implemented through image correlation. Based on the comparison results, the present embodiments can determine or identify data in the candidate image that is similar to and/or matches the query image, thus providing a match of video data. The generation of two-dimensional spatiotemporal slice images of query and candidate data allows the present embodiments to perform a comparison of two-dimensional static images, drastically simplifying the comparison of query and candidate video data.

The collection or concatenation of slices (e.g., 220) for a series of frames contains a relatively large amount of information in a relatively small amount of data. In video content there is typically motion, for example, an object in the frame is moving, the camera is moving, the camera is zooming in or out, and other types of motion. This motion results in variations over the slices taken over multiple frames. The variations allow for relatively unique two dimensional spatiotemporal images to be generated.

Utilizing the slices of data significantly reduces the amount of data and the amount of computational processing needed to evaluate the data and/or compare data. Further, the utilization of slices as indicated above provides for a difference between frames that provide relatively unique two dimensional spatiotemporal images for use in comparing, improving the accuracy of comparisons. Still further, the use of slices allows data to be retrieved from each frame, or in some embodiments a multiplicity of frames of a series of frames (e.g., every other frame, every $n^{th}$ frame, and the like) to be utilized avoiding the inherent inaccuracies associated with key frames and the use of only relatively few frames. Additionally, the concatenation of the slices into a two-dimensional spatiotemporal image allows the comparison of a query clip to that of a candidate video to be simplified into still image comparisons. Still image comparisons generally require much less computational processing than video comparison. Therefore, the present embodiments improves video comparison accuracy; utilize much less data for query and candidate data, and thus reducing the amount of processing because there is less data; reduces the processing because the comparison is simplified, in some preferred embodiments, to still image comparisons; achieved a high degree of reliability, based in part, on the changes in frames over a series of frames; reducing the time needed to search data; provides an intuitive process that does not require system and/or user training; and provide many other advantageous.

In some implementations, the two-dimensional slice image (e.g., image 420) of the query and/or candidate data is generated by skipping or removing slices of some frames. For example, the two-dimensional slice image may be generated with a slice from every other frame, or every $n^{th}$ frame, or some other pattern. The two-dimensional image generated through the use of slices from less than all of the frames further reduces the amount of data and thus the amount of data processing, while still providing a static slice image with significant data due, at least in part, to the changes between slices.

In some embodiments, the comparison of query to candidate two-dimensional slice images is performed through an initial coarse or rough comparison, and then through one or more precision comparisons. For example, coarse two-dimensional slice query and/or candidate images can be initially generated with slices from less than all of the frames of a series of frames. An initial comparison is then performed of the coarse two-dimensional images providing comparison results identifying those portions of the candidate data that are at least roughly similar to the coarse query slice image. This coarse comparison reduces the amount of data and typically reduces the amount of computational processing. A coarse threshold can be set to determine whether the coarse query and candidate slice images appear to match. Alternatively and/or additionally, an initial query slice and candidate slice images can be generated from slices of each frame. These initial slice images can then be adjusted to reduce the amount of data associated with each image producing coarse slice images. For example, the initial slice images can be reduced by extracting only every $n^{th}$ pixel of data, or only the luminance data is extracted to generate the coarse slice images. These coarse slice images are then compared with reduced processing because of the reduced data. Matches in the coarse comparison can be deemed a match between query and candidate data in some implementations.

In other implementations, once coarse matches are identified in the coarse comparison results, detailed two-dimensional spatiotemporal query and/or candidate slice images (e.g., such as the initial, full slice images) can be utilized and/or generated for those areas that appear to be a coarse match. A subsequent comparison of the detailed query and candidate images is then performed to more accurately determine whether the candidate image contains data that matches the query image. In some embodiments, a difference is determined between at least a portion of the query image and at least a portion of the candidate image. A detailed threshold can be established as a measure of the differences between the images. For example, when the difference between images is less than the detailed threshold, the images are designated as a match.

The query data is identified in the candidate data by searching the candidate image slice for the query slice image. The searching of the candidate data is achieved through substantially any relevant search methods and/or algorithms, such as bisectional search method and other relevant search methods.

In some embodiments, additional accuracy and/or image distinctions are achieved by generating two-dimensional extended slice images of the query data and at least a portion of the candidate data. An extended slice image is generated, in some implementations, by incorporating one or more frames into a two-dimensional spatiotemporal slice image. For example, in some embodiments, data associated with an initial frame of a series of frames (e.g., frame 122 of FIGS. 1 and 2) is cooperated with a spatiotemporal slice 220 of at least a portion of the remaining frames of the series.

Figure 8:
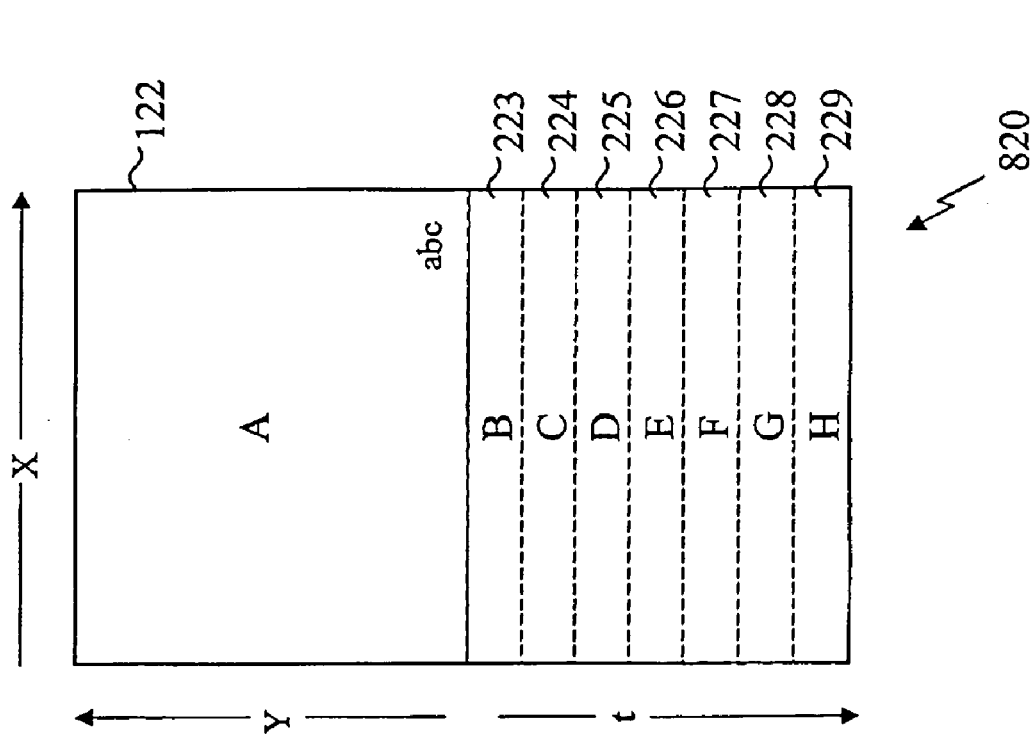
FIG. 8 depicts a simplified block diagram of an extended horizontal two-dimensional slice image as generated according to some embodiments of the series of frames shown in FIGS. 1 and 2.

FIG. 8 depicts a simplified block diagram of an extended horizontal two-dimensional slice image 820 as generated according to some embodiments of the series 120 of frames 122-129 shown in FIGS. 1 and 2. In generating the extended slice image 820 of FIG. 8, the data of the entire initial frame 122 is concatenated with the image slices 223-229 from the subsequent frames 123-129. As a result, the extended two-dimensional slice image 820 provides added detail and distinctions to the slice image 820 to provide an enhanced and/or more accurate comparison to the candidate data being searched and/or compared. Because of the additional detail of the entire frame 122, a more precise match can be achieved in verifying a search has located a match.

Figure 9:
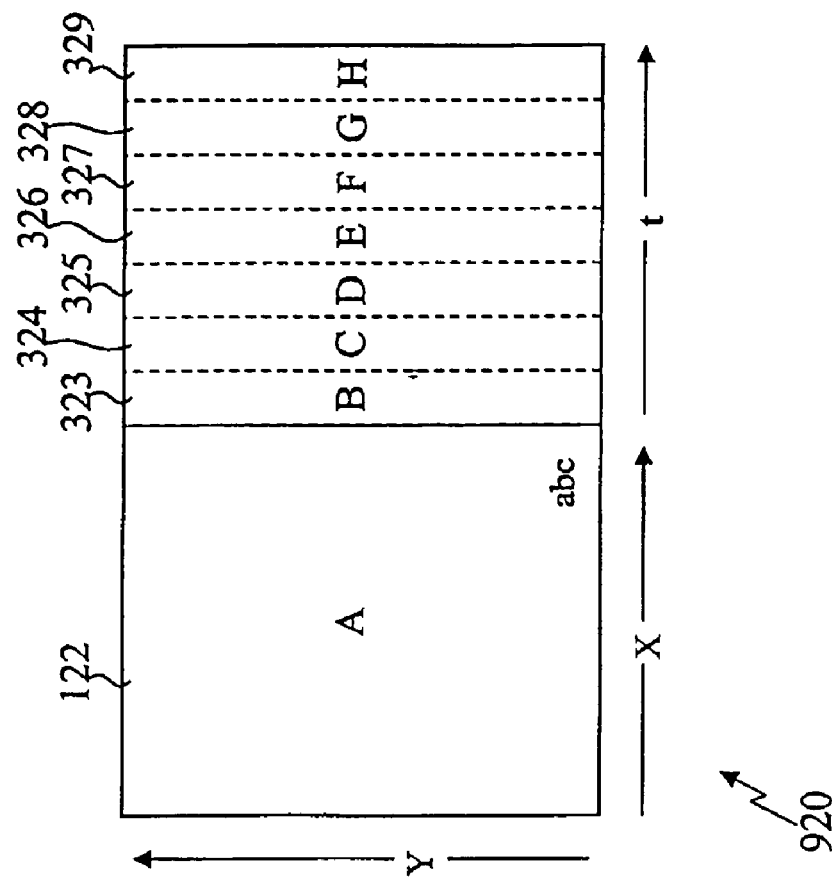
FIG. 9 depicts a simplified block diagram of an extended vertical two-dimensional slice image extracted from the frame of FIGS. 1 and 3.
Figure 10:
FIG. 10 depicts a pictorial representation of an extended horizontal slice image representation of the same video sequence of FIG. 6, with the first slice replaced with a full frame.
Figure 11:
FIG. 11 depicts a pictorial representation of an extended vertical image representation of the video sequence of FIG. 7, with the first slice replaced with a full frame.

FIG. 9 depicts a simplified block diagram of an extended vertical two-dimensional slice image 920. Data of an initial frame, for example frame 122 of FIGS. 1 and 3, is concatenated with vertical slices 323-329 from subsequent frames 123-129 to generate the vertical extended slice image 920. FIG. 10 depicts a pictorial representation of an extended horizontal slice image representation 1020 of the same video sequence of FIG. 6, with the first slice 622 of FIG. 6 replaced with a full frame 1022 from which slice 622 was extracted. Similarly, FIG. 11 depicts a pictorial representation of an extended vertical image representation 1120 of the video sequence of FIG. 7, with the first slice 722 of FIG. 7 replaced with a full frame 1122 from which slice 722 was extracted.

The extended images of FIGS. 8-11 are shown with a full frame (e.g., frame 122) followed by slices from subsequent frames. Other configurations of extended slice images are utilized in some embodiments. For example, in some implementations, a series of slices are concatenated with a final full frame appended. In some implementations, a full frame is selected within a series of frame such that slices precede the full frame and slices follow the full frame. Some extended slice images are generated with more than one full frame included in an extended image. In some embodiments, extended frames are generated with one or more enlarged or extended slices, instead of full frames, which are concatenated with the other slices of subsequent and/or preceding frames.

In generating extended slice images, some embodiments initially determine or identify shot or scene boundaries. Once boundaries are identified, the extended slice images can be generated based on the boundaries. For example, the first frame following a boundary can be included in the extended slice image as the first part of the image, followed by the slices of subsequent frames concatenated together and with the first frame of the shot or scene. Matching a full frame at the beginning or ending of a shot sequence is, in some implementations, more likely because the detections of the shot boundaries are generally consistent. This is particularly true when the same shot boundary detection algorithms are employed in evaluating both the query and candidate data.

Having generated one or more two-dimensional slice images of query and candidate data, these static images are then compared to determine whether the candidate data includes one or more clips that are the same as or similar to the query data. The extended slice images can be utilized in many instances, for example, when the query data is short or has limited data, when the query data does has limited movement and/or changes, to provide enhanced searching on candidate data identified as potential matches based on broader and/or less precise searching, and many other applications.

Figure 12:
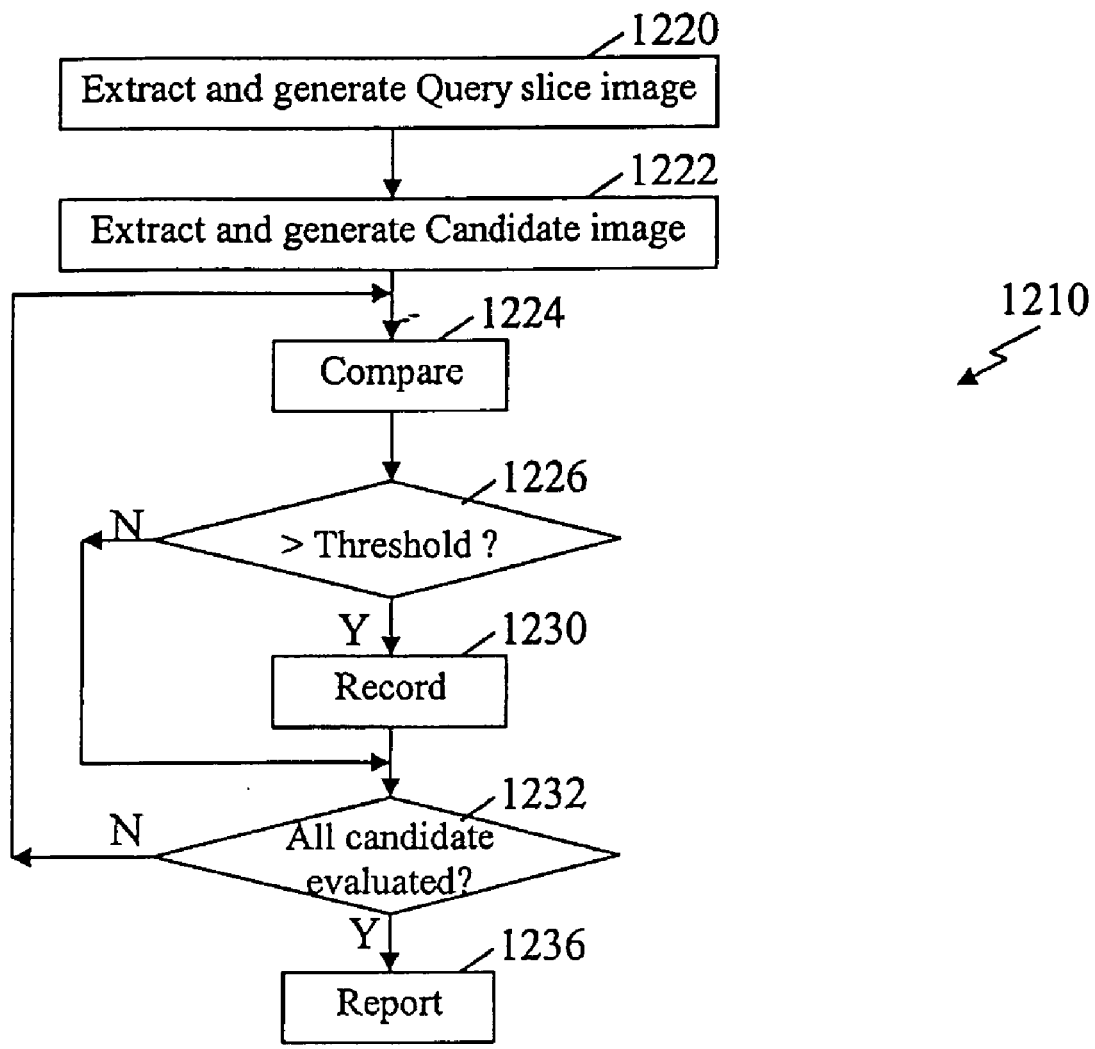
FIG. 12 depicts a simplified flow diagram of a process, according to some embodiments, for use in searching candidate data, such as video data.

FIG. 12 depicts a simplified flow diagram of a process 1210, according to some embodiments, for use in searching candidate data, such as video data. In step 1220, a spatiotemporal representation of at least a portion of a query sequence of video data is extracted and a query slice image is produced from the query spatiotemporal representation of the at least the portion of the query sequence. The query slice image is generated, in some preferred embodiments, by extracting slices from a plurality of frames within the query sequence. In some embodiments, the positioning and/or orientation of this slice relative to the spatial boundaries of the frame (e.g., X and Y axes), and/or the temporal parameters defined by the query sequence are evaluated and selected to achieve a preferred and/or optimal query slice image.

Still referring to FIG. 12, in step 1222 a spatiotemporal representation of at least a portion of a spatiotemporal representation of at least a portion of candidate video data is extracted and a candidate slice image is produced from the spatiotemporal representation of at least the portion of the candidate video data. As with the query slice image, the candidate slice image is also generated by extracting slices from a plurality of frames within the candidate video data. The positioning, orientation and shape of the spatiotemporal slice from the candidate data is typically taken at the same positioning, orientation and shape as the query spatiotemporal slice.

In step 1224, the two-dimensional query slice image and at least a portion of the two-dimensional candidate slice image are compared, producing comparison results. For example, the comparison can determine a difference between the slice images and the comparison results can be a summation of the differences. In step 1226, the process 1210 determines whether the difference is less than a threshold. Typically, when the query slice image matches at least a portion of a candidate slice, there is a significant drop in the difference providing an accurate indication of a match.

When it is determined that the difference is less than the threshold, step 1230 is entered where the portion of the candidate slice image is recorded. In step 1232 it is determined whether the entire candidate data has been evaluated. If the entire candidate data has not been evaluated, the process returns to step 1224, otherwise step 1236 is entered. In step 1236, the portions of the candidate data that match the query data are reported.

As discussed above with reference to step 1220, in some embodiments, the positioning, orientation and/or shape of the spatiotemporal slice across the sequence of frames is determined. The use of the slice images takes advantages, in some implementations, of the changes over time between frames of the sequence. In some embodiments, the determination of the positioning of the slice (whether horizontal, vertical, diagonal, or other shapes and where in the frame relative to the X and Y axes) is determined by tracking or monitoring changes in the frames over the sequence. These changes over time are determined, in some implementations, by compare two, or a few selective frames distributed over the sequence for differences. This comparison is typically a simple comparison of frames and uses, for example, luminance, one color or other simple comparison. The locations of the greatest differences are identified in the two or few selected frames, and the positioning, orientation, and/or shape of the spatiotemporal slice (e.g., slices 220, 320) are defined relative to those areas with the greatest differences.

In some embodiments, the entire candidate data for a single video content (e.g., all the frames of a video) is sliced and concatenated into a single long two-dimensional slice image (e.g., image 420, 520 of FIGS. 4 and 5, respectively) or extended slice image (e.g., 820, 920 of FIGS. 8 and 9, respectively). In some alternative embodiments, a single video content can be divided into multiple clips or sequences, for example through shot or scene detection, dividing the single video content into multiple video clips. Multiple two-dimensional slice images are generated for each clip for comparison. The query data can similarly be process to concatenate slices into a single two-dimensional query slice image, or divided into clips (e.g., separated based on shot and/or scene detection) with multiple two-dimensional query slice images generated for each clip.

Figure 13:
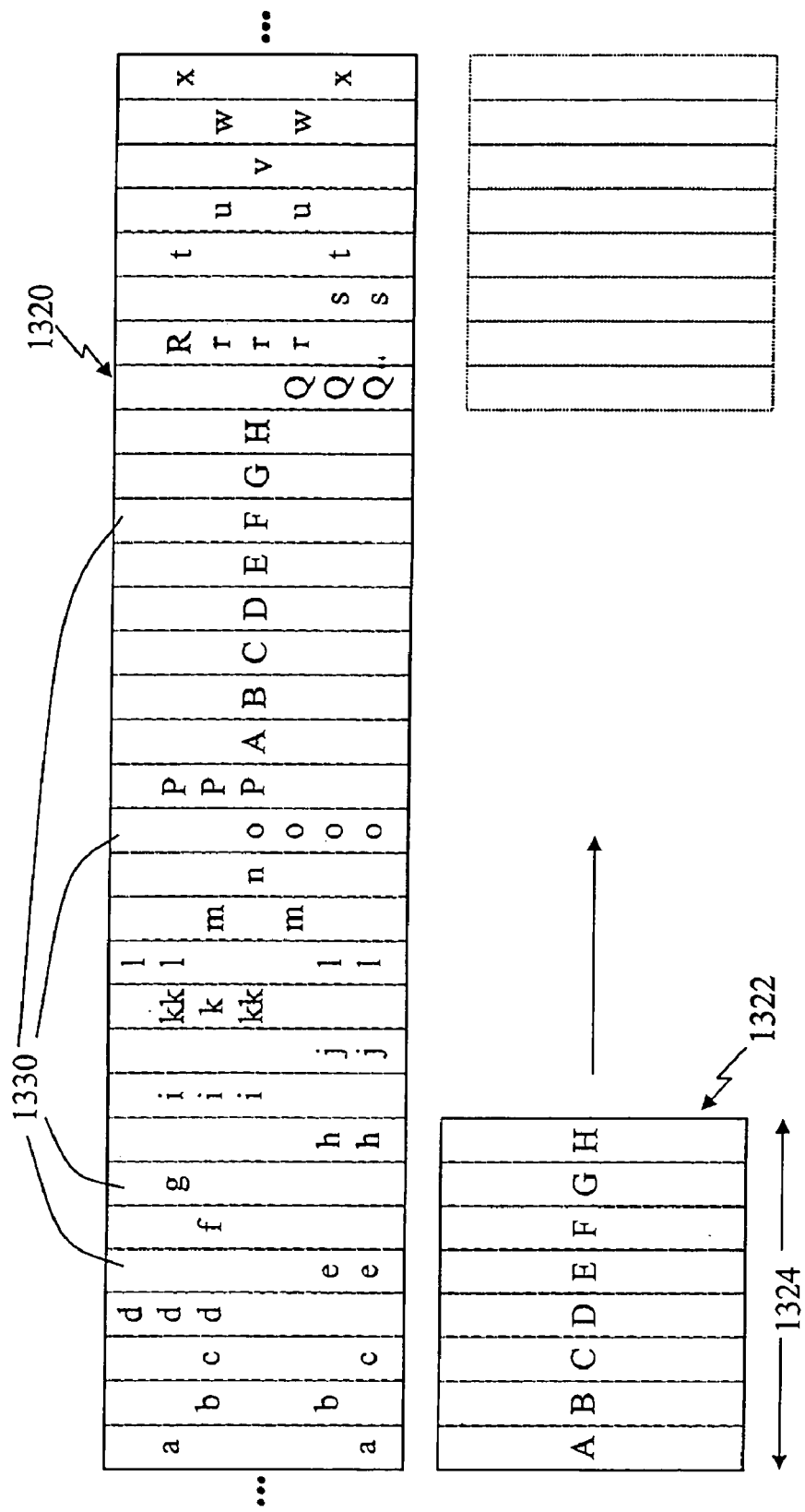
FIG. 13 depicts a simplified block diagram of a portion of a candidate slice image and a query slice image, where the query slice image provides a sliding window comparison to the candidate slice image.

In some embodiments, the comparing of a query slice image to the candidate slice image or images is implemented through a sliding window process where a query slice image is in effect slid along a candidate slice image for comparison purposes. FIG. 13 depicts a simplified block diagram of a portion of a candidate slice image 1320 and a query slice image 1322, where the query slice image is to be slid along the candidate slice image during comparison.

This sliding is executed, in some implementations, pixel row by pixel row (and/or pixel column by pixel column, depending on whether the slice images are horizontal or vertical slice images). The sliding is executed in some embodiments by sliding the query slice image 1322 along the candidate slice image 1320 slice 1330 by slice 1330, or multiple slice by multiple slice (e.g., sliding the query slice image n slices, comparing, sliding the query slice image another n slices and comparing, and so on).

Some embodiments additionally and/or alternatively perform a coarse slide comparison by effectively sliding the query slice image 1322 along the candidate slice image 1320 by lengths 1324 of the query slice image, or even more than a length of the query slice image. When it appears based on a comparison that a portion of the query slice image is similar to a portion of the candidate slice image being compared, the sliding process can be backtracked to slide the query slice image back along the candidate slice image and continue the comparison through a finer comparison, such as pixel row by pixel row, or slice by slice. For example, as the query slice image 1322 is slid along the candidate slice image 1320, and the comparison process detects that a right quarter of the query slice image is similar to a left side of a target portion of the candidate slice image being compared, the process backs up to compare the portion or portions of the candidate slice image skipped. In some implementations, the process reverses the comparison (e.g., pixel by pixel, slice by slice, or the like) until a match is detected (e.g., differences fall below a threshold) or query slice returns to a position already evaluated.

The comparisons of the query and candidate data performed through the present embodiments are greatly simplified and generally require significantly less computational processing by performing image comparison rather than video comparison. Comparing the static query and candidate two-dimensional slice images is implemented through substantially any image comparison technique. The comparison, in some implementations, is implemented by taking a difference between the query and candidate images, and when the differences are below a threshold, the images are considered similar or the same. The difference obtained, for example in subtracting the corresponding pixels between query and candidate slice images, can be summed or added to get a total difference value. The total difference value can then be compared with a threshold to determine similarity between query and candidate data. Often, the difference value will result in a drastic down spike when slice images are similar and/or the same, allowing for accurate determination of matches. In some embodiments, a pixel by pixel comparison is utilized (e.g., comparing color and luminance characteristic data and/or vectors for each pixel). Some implementations use histograms, and/or other image comparison techniques.

The utilization of slices to generate the two-dimensional slice images drastically reduces the amount of data to be compared and the comparison (e.g., pixel by pixel, histogram, and other such comparisons) typically does not require excessive computational processing. In some implementations, however, the comparison processing is further reduced by reducing the total number of pixels compared. For example, the comparison can be implemented by comparing every other pixel, every $n^{th}$ pixel or some other ratio that utilizes less than all of the pixels.

In some embodiments, the comparison is simplified and/or further simplified by comparing only a limited number of characteristics of pixel data. For example, some implementations initially only utilize luminance data, or a single color data in performing the comparison. Once a potentially match is identified, some embodiments, perform a more precise or more thorough comparison by using more or all pixel characteristic data.

As indicated above, some embodiments perform the comparison of the two-dimensional query slice image with the two-dimensional candidate slice image and/or portions of the candidate slice image in an initial coarse or rough comparison, followed by one or more thorough or more precise comparisons. These coarse and fine comparisons reduce, in some implementations, the computational overhead and/or provide higher precision results.

Figure 14:
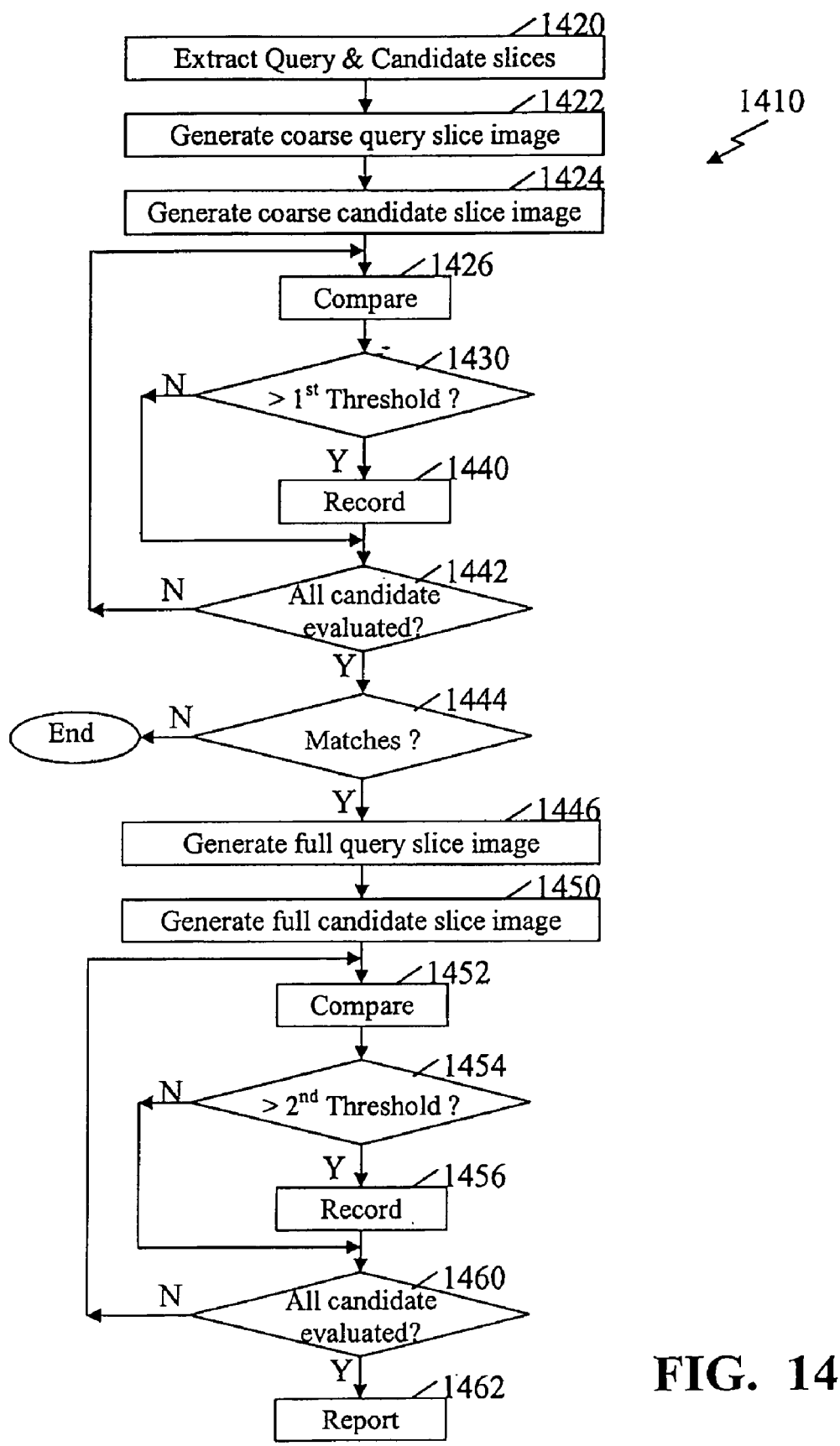
FIG. 14 depicts a simplified flow diagram of a process for use in comparing query data and candidate data.

FIG. 14 depicts a simplified flow diagram of a process 1410 for use in comparing query data and candidate data. In step 1420 slices are extracted from each frame of a query clip and the candidate data. In step 1422, a coarse or rough two-dimensional query image is generated (e.g., a horizontal image). This coarse query image is generated utilizing a subset or less than all of the data associated with each slice of the query image. For example, the coarse query image can be generated utilizing data from every other frame, every $n^{th}$ frame, every $n^{th}$ pixel, just luminance data, just one color, and other such reduced and/or limited data. In step 1424, one or more coarse two-dimensional candidate slice images are similarly generated for the candidate data or portions of the candidate date (e.g., when the candidate data is divided into multiple clips as defined by scene boundaries). Again, the coarse candidate slice image is generated with a subset or limited data, and preferably utilizes the same subset of data as defined in generating the coarse query slice image.

In step 1426, the coarse query slice image and the coarse candidate slice images are compared. In step 1430, the process 1410 determines when the differences between the query and candidate slice images are less than a first threshold (or similarities are above a threshold). If the differences are not less than the first threshold, the process continues to step 1442, other wise step 1440 is entered where the candidate image or the portion being compared is record as a coarse match. In step 1442, the process determined whether the entire candidate data has been evaluated (e.g., all the clips of the candidate data have been compared with the coarse query slice image). If the entire candidate slice image has not been compared, the process returns to step 1426 to continue the comparison.

When all of the candidate data has been compared, the process continues to step 1444 to determine whether any portions of the coarse candidate slice image or images were determined as a coarse match. If not, the process 1410 reports that no match was found and terminates. Alternatively, when a coarse match is detected, step 1446 is entered where a more precise two-dimensional slice image is generated for the query data or clip. For example, the more precise query slice image can utilize data for all of the pixels in the slices, include luminance and color, include all colors, utilize slices from all of the frames, and/or other factors to provide a more precise comparison. In step 1450, a similar more precise slice image of the candidate data and/or of those portions of the candidate data that were recorded in step 1440 as a coarse match.

In step 1452, the more precise two-dimensional query slice image is compared against the more precise two-dimensional candidate slice image or images of the recorded portions of the candidate data. In step 1454, the process determines if the difference between the more precise query and candidate slice images are less than a second threshold. When the differences are not less than the second threshold, the process continues to step 1460, alternatively, step 1456 is entered where the candidate data and/or portions of the candidate data are record and/or reported as a match with the query data. In step 1460, it is determined if all portions recorded in coarse comparison of candidate images have been compared. If not, the process returns to step 1452. When the candidate data has been fully compared, the process continues to step 1462 to report that the candidate matches the query data, and/or identifies those portions of the candidate data that match the query data.

The comparison of coarse and/or precise query and candidate slice images can be implemented through substantially any comparison techniques. In some embodiments, histograms are computed of the query and candidate slice images and these histograms are compared. Substantially any histogram generation and comparison can be utilized, such as color histograms, gray level histograms, and other such relevant histograms. The query and candidate slice images are compared, in some embodiments, utilizing features such as color, texture, shape, edge, color layout, edge, and various coefficients in frequency domain, such as FFT coefficients, wavelet coefficients and so on, and other such features. In some implementations, the coarse to fine comparison is employed, while additionally and/or alternatively some simple image features are utilized.

Figure 15A:
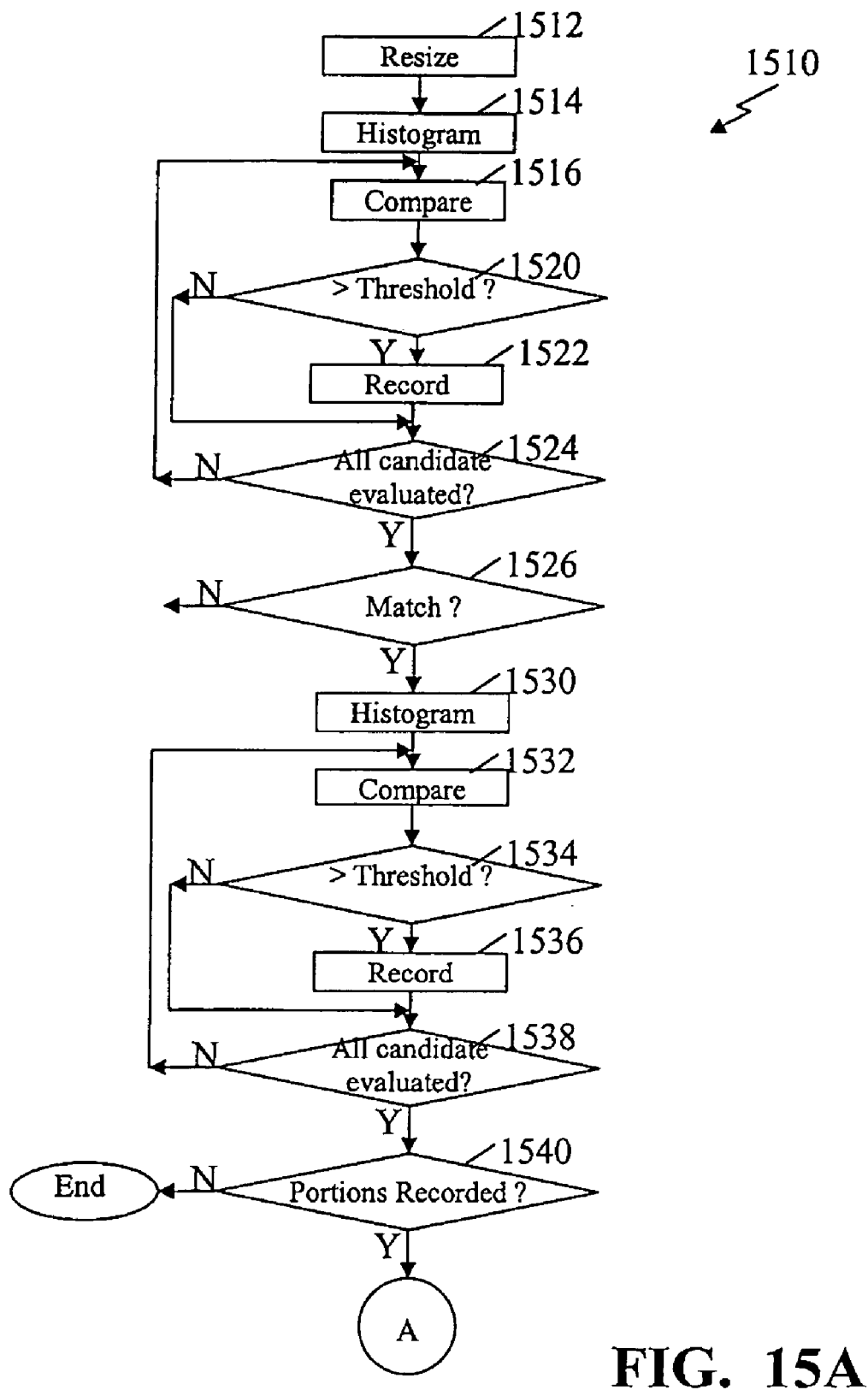
FIGS. 15A-B shows a flow diagram for a process of comparing static two-dimensional query slice images to one or more static two-dimensional candidate slice images.
Figure 15B:
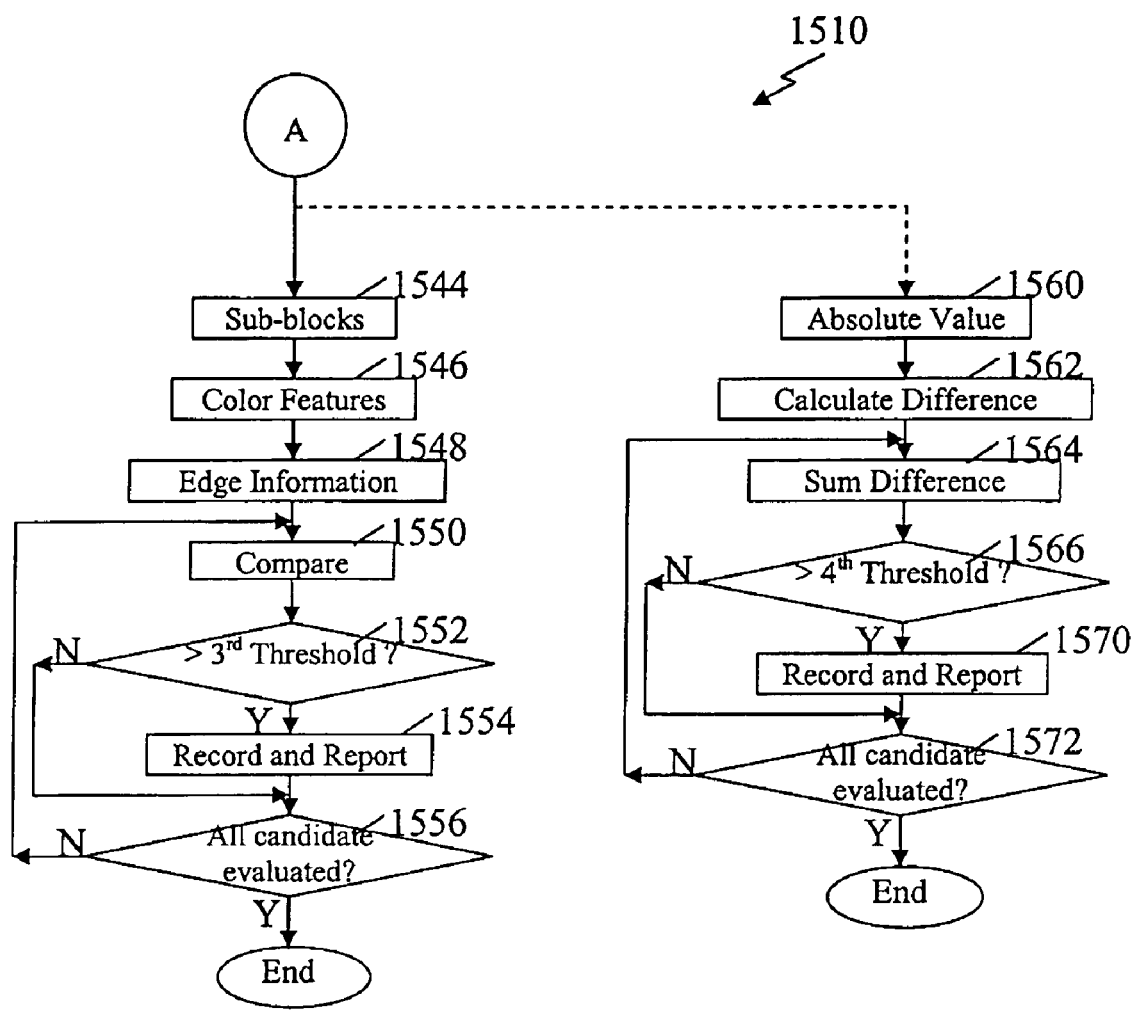

FIGS. 15A-B shows a flow diagram for a process 1510 of comparing static two-dimensional query slice images to one or more static candidate slice images. The process is typically repeated for each candidate slice image when multiple candidate slice images exist (e.g., candidate data is divided into multiple clips, there are multiple candidate data, etc.). In some implementations, however, the comparison may simply be employed to determine whether the query video data is included in the candidate data and/or simply to find a first occurrence of the query data in the candidate data, and then halt the process once a match is found. In some embodiments, the comparison performs a coarse or rough comparison, followed by a finer comparison. Some embodiments, however, only perform a single comparison, such as a single fine or precise comparison.

In step 1512, the two-dimensional query and candidate images are resized (reduced) and/or simplified. This simplification can include reducing the number of pixels in each of the query and candidate slice images (e.g., only using every $n^{th}$ pixel, using every other pixel, or some other scheme), extract only luminance or a single color information for pixels of the query and candidate images for comparison, and other such simplification methods. In step 1514, a simplified histogram is generated for the simplified or resized query and candidate slice images. In step 1516, the histogram information is compared to determine the differences between the query and candidate images.

The process 1510 then evaluate in step 1520 whether the difference between the query and candidate images is less than a first threshold. If the difference is less than the threshold, the process identifies the candidate image or the portion of the candidate image being compared as being similar, and in step 1522 records that the image or the portion of the image is similar. For example, a list or table is stored in a memory identifying all of the portions of the candidate image that match the query data. The process then continues to step 1524. If the difference in step 1520 is not less than the threshold, the images or portions of images being compared are deemed different, and the process continued to step 1524. In step 1524, it is determined whether the entire candidate image has been compared and/or whether each of a plurality of candidate images have been compared. If not, the process returns to step 1516 to continue the comparison. If the entire candidate image has been compared, the process continues to step 1526.

In step 1526, it is determined whether the coarse candidate image or one or more portions of the coarse candidate image match the coarse query image. If not, the process 1510 terminates. When the coarse candidate image contains one or more matched portions that matches the coarse query slice image the process continues to perform a more refined comparison.

In step 1530, histograms based on converted RGB color space to perceptually uniform space, hue saturation value (HSV), are generated for both the full or non-simplified query and candidate images. In step 1532, a difference is computed between the query image and candidate image or portions of the candidate image based on the histograms. In step 1534, it is determine whether the difference is less than a second threshold. If the difference is less than the second threshold, the process continues to step 1536 where the candidate image or the portion of the image being compared is recorded. When the difference is not less than the second threshold, the candidate image or portion being compared is deemed not similar and the process continues to step 1538.

In step 1538, it is determined whether the entire candidate image has been compared and/or whether each of a plurality of candidate images have been compared. If not, the process returns to step 1532 to continue the comparison. If the entire candidate image has been compared, the process continues to step 1540.

In step 1540, it is determined whether the candidate image or portions of the candidate image were recorded. If not, the process terminates. If the candidate image or portions thereof were identified and recorded, the process continues using edge information and/or color layout to further confirm whether the query and candidate images are similar. In step 1544, the full query and candidate images are divided into a plurality of sub-blocks. In step 1546, color features are extracted from each of the plurality of sub-blocks for both the query and candidate images. In this way, some local information can be taken into account. In step 1548, edge information is extracted from each sub-block for both the query and candidate images, for example, through an efficient Sobel edge detection. In some embodiments, only one of steps 1546 and 1548 is performed and utilized for comparison to simplify the comparison.

In step 1550, the query slice image color and/or edge information is compared with the color and/or edge information of the candidate slice image. In step 1552, the process determines whether the differences between the query color features and/or edge information and the candidate color features and/or edge information are less than a third threshold. If they are less than the third threshold, the candidate image and/or portions of the candidate image are identified as a match, recorded and/or reported as a match in step 1554. Alternatively, if the difference is not less than the third threshold, the query and candidate images or portions thereof are considered not matched. In step 1556, the process determines whether all of the candidate image has been compared and/or whether each of a plurality of candidate images have been compared. If not, the process returns to step 1550 to continue the comparison. If all of the candidate image has been compared, the process terminates.

Alternatively and/or additionally, in some embodiments a direct image to image difference is utilized to determine the similarity between the query and candidate slice images. In such embodiments, steps 1560-1572 are performed in addition to and/or alternatively to steps 1544-1556.

In step 1560, absolute values are generated for a plurality of pixels of the query and candidate slice images (e.g., every $n^{th}$ pixel). In some preferred embodiments, absolute values are generated for every pixel. In step 1562, differences are calculated between corresponding pixels of the query and candidate slice images. In step 1564 the differences are summed. In step 1566, the process determines whether the differences exceed a fourth threshold.

When the differences are less than the fourth threshold, the candidate image and/or portions of the candidate image are identified as a match with the query image, recorded and/or reported as a match in step 1570. Alternatively, when the sum difference is not less than the fourth threshold, the query and candidate images or portions thereof are considered not matched. In step 1572, the process determines whether all of the candidate image has been compared and/or whether each of a plurality of candidate images have been compared. If not, the process returns to step 1562 to continue the comparison. If the entire candidate image has been compared, the process terminates.

Figure 16:
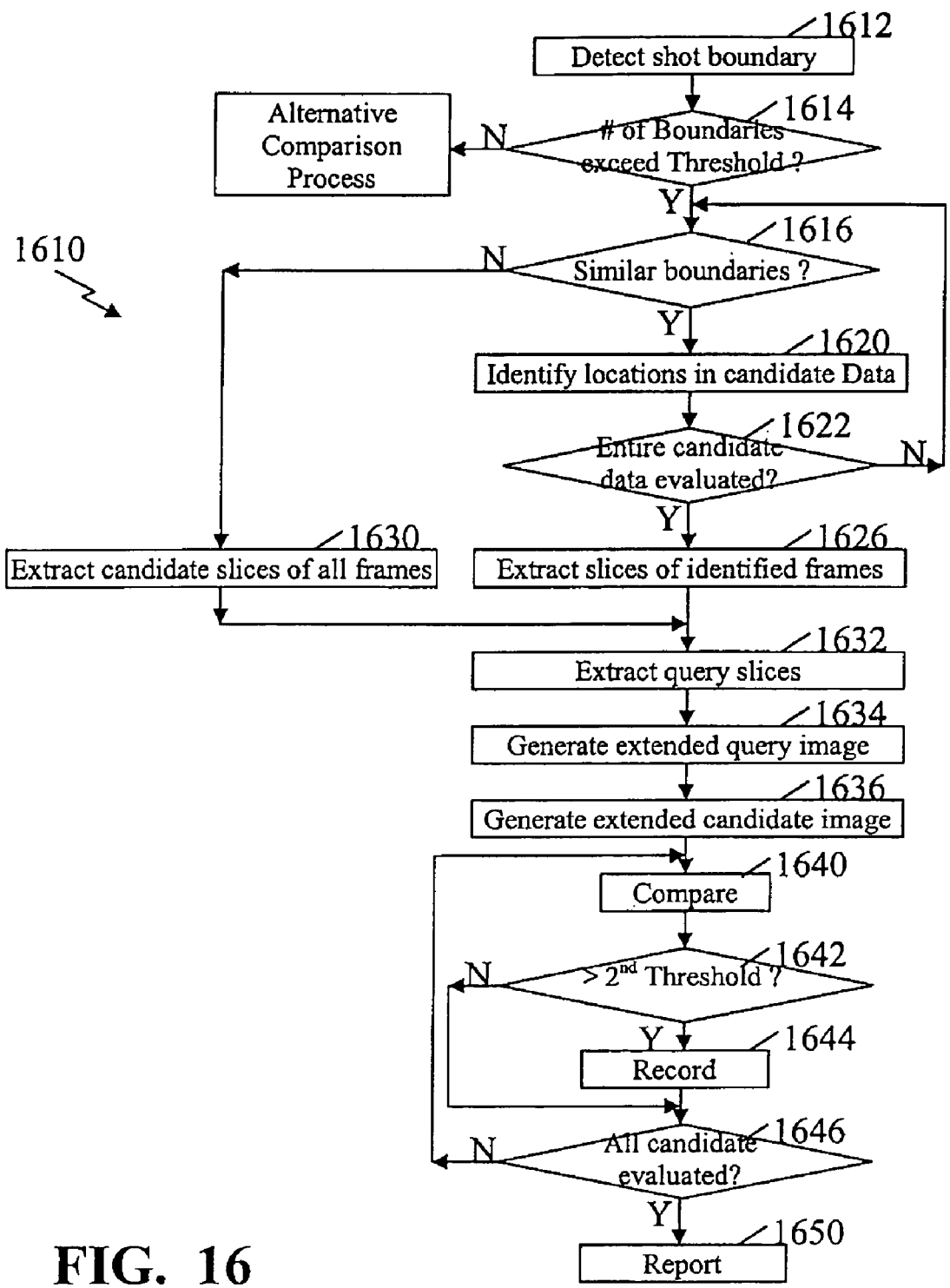
FIG. 16 depicts a simplified flow diagram of a process for use in comparing query data and candidate data.

FIG. 16 depicts a simplified flow diagram of a process 1610 for use in comparing query data and candidate data according to some embodiments. In step 1612, shot or scene boundaries are detected for query and candidate data. The number of boundaries can depend on many considerations, such as the amount of data to be compared, the expected computational processing, and other such criteria. In some embodiments, the process 1610 requires at least one shot boundary and that shot boundary can be the first frame of the clip. In step 1614, the process determines whether there are at least a predefined number of shot boundaries detected within the query data. If there is not at least the predefined number of shot boundaries, the process shifts to an alternative process for comparing query and candidate data. For example, the process 1610 may incorporate the process 1410 of FIG. 14.

Shot or scene detection is based, in some implementations, on identifying boundaries and/or video shot changes, such as, a camera break from one scene to another, fad-in and/or fad-out, and other such shot changes and/or discontinuity in the video data. In some embodiments, a coarse to fine method is used for efficient shot boundary detection. Initially, a partial block-based comparison technique is used to determine the amount of change that occurs between a pair of distant frames. When the change is greater than some predefined threshold, edge and/or color differences are computed between the pair of frames to confirm that a change has occurred. Following a confirmation of the change, a step variable technique is used to locate the change between two consecutive frames. If the partial block-based comparison technique obtains a difference between the consecutive frames that exceeds the predefined threshold, then an abrupt change is detected. Otherwise, edge and/or color differences are used to determine whether a gradual transition has occurred. The present embodiments can employ substantially any relevant technique and/or combinations of techniques for shot boundary detection including, but not limited to shot boundary techniques described in: U.S. patent application Publication No. 20030091235, filed on Nov. 9, 2001 by Wei Xiong and entitled SHOT BOUNDARY DETECTION; H. J. Zhang, A. Kankanhalli, S. W. Smoliar, "Automatic partitioning of full-motion video", Multimedia system, 1: 10-28, 1993; Browne, P., Smeaton, A. F., Murphy, N., O'Connor N., Marlow, S., Berrut, C. Evaluating and Combining Digital Video Shot Boundary Detection Algorithms. In Proceedings of the Fourth Irish Machine Vision and Information Processing Conference, Queens University Belfast, September 1999; and Nilesh V. Patel and Ishwar K. Sethi, "Video shot detection and characterization for video databases," Pattern Recognition, vol. 30, no. 4, pp. 583-592, April 1997, all of which are incorporated herein by reference.

Still referring to FIG. 16, when it is determined in step 1614 that the query clip includes the predefined number of shot boundaries, step 1616 is entered where it is determined whether the query clip and a least a portion of the candidate data have similar shot boundary patterns. For example, the process evaluates the shot boundaries and determines a total number of number of shot boundaries, the number of frames between shot boundaries, and/or other such patterns or combinations of patterns. If similar boundaries are not detected, the process continues to step 1630. Alternatively, step 1620 is entered where locations in candidate data are identified where shot boundaries are within a first threshold and these identified locations are recorded. In step 1622, it is determined whether the entire candidate data has been evaluated. If not, the process returns to step 1616, otherwise the process continues.

When the entire candidate data has been evaluated, step 1626 is entered where spatiotemporal slices are extract from each frame of the candidate data for the one or more portions identified as having matched boundaries with the query data (in some embodiments, the slices are extracted from each frame other than first frames following shot boundaries). If there are not similar boundary patterns detected in step 1616, the process alternatively enters step 1630 where spatiotemporal slices are extracted from each frame of the candidate data (in some embodiments, the slices are extracted from each frame other than first frames following shot boundaries). In step 1632, spatiotemporal slices are also extracted from each frame of query data.

In step 1634, one or more extended query slice images (e.g., extended horizontal slice image 820 of FIG. 8) are generated for each shot of the query clip or clips. The extended slice image can be generated by including one or more full frames into the slice image. For example, the first frame following a shot boundary is selected, with the spatiotemporal slices of the remaining frames between a pair of boundaries appended to the first frame. The extended slice image, however, can be generated with other frames (e.g., last frame between boundaries, first and last frames, a middle frame, parts of one or more frames, and the like). Similarly in step 1636, an extended candidate slice image is generated for each clip identified in step 1620 as having similar boundaries as the query clip, or each clip of the candidate data when similar boundary patterns are not detected.

In step 1640, the extended query slice images and extended candidate slice images are compared. In those embodiments where similar boundary patterns are identified, the extended query slice image is compared with one or more portions of the extended candidate slice image of the associated and identified portions of data. In step 1642, the process determines whether the difference is less than a second threshold. If the difference is not less than the second threshold, the process continues to step 1646. Alternatively, when the difference is less than the second threshold, the portion or clip of the candidate data associated with the compared extended candidate slice image is recorded in step 1644, and then the process continues to step 1646.

In step 1646, it is determined whether all extended query and candidate images have been compared. If not, the process returns to step 1640 to further compare the candidate data with the query data. When all of the candidate data is evaluated, step 1650 is entered where the portions or clips of the candidate data matching the clips of the query data are reported.

The processes 1410, 1510 and 1610 of FIGS. 14, 15A-B and 16 can be combined and/or alternative processes can similarly be employed using portions of each process 1410, 1510, 1610. For example, the process can initially determine shot boundaries, and then generate coarse slice images of those areas with matching boundaries, followed by a more precise comparison of those areas that are determined to be similar in the coarse analysis. Additionally and/or alternatively, the present embodiments can define candidate and query data a match based solely on identifying similar shot boundary patterns.

The slice extraction, slice image generation and two-dimensional static slice image comparison can be implemented through software, hardware, and/or a combination. In some preferred embodiments, the system for data comparison is implemented substantially through hardware.

Figure 17:
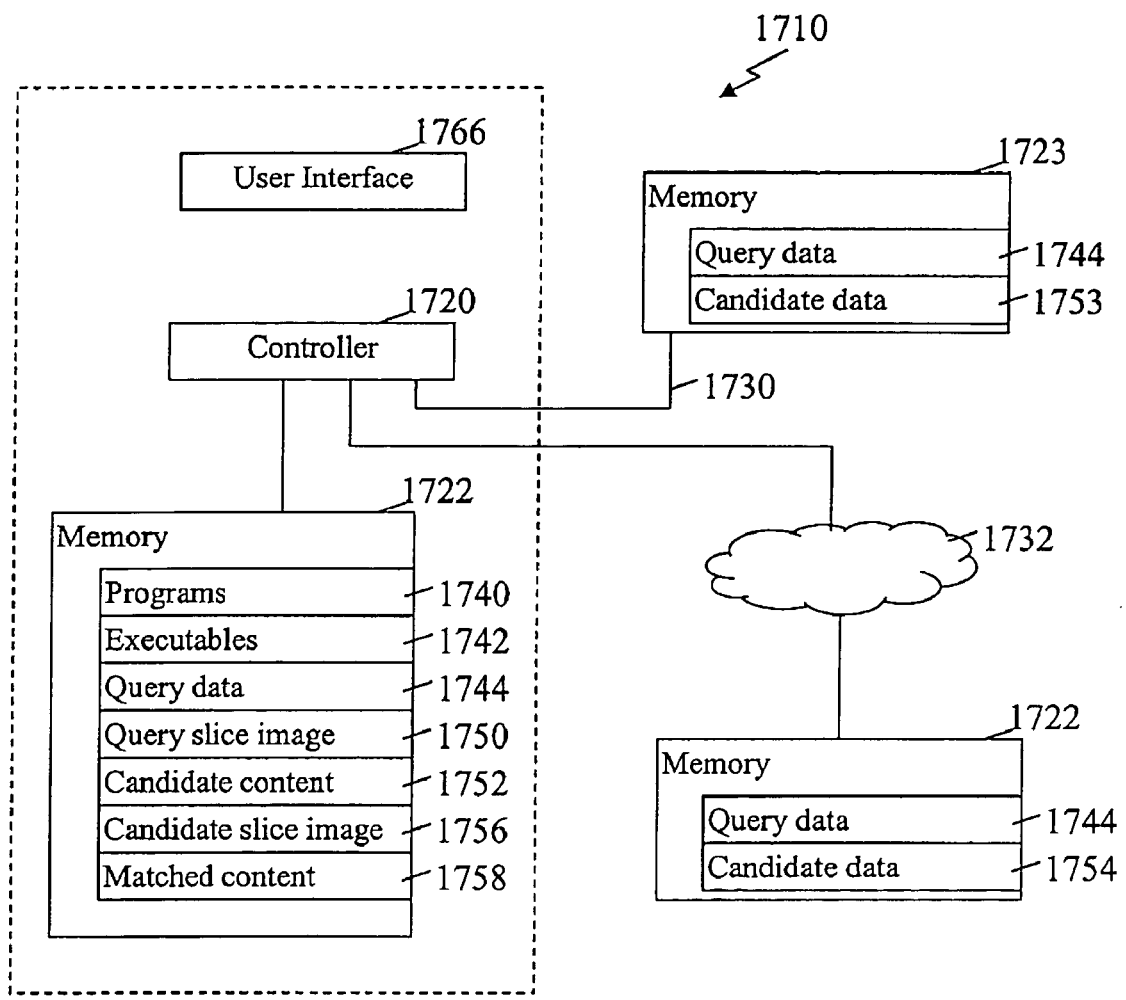
FIG. 17 depicts a simplified block diagram of a system for use in searching video and other similar content.

FIG. 17 depicts a simplified block diagram of a system 1710 for use in searching video and other similar content. The system includes a controller 1720, which can be implemented through substantially any relevant controller including one or more computer, one or more microprocessors, and other such controllers and/or combinations of controllers. The controller 1720 couples with one or more memory storage devices 1722-1724 (e.g., ROM, RAM, optical disks, latch, register and other such data storage devices and/or combinations of storage devices) within which query and/or candidate data is maintained. In some embodiments, one or more memory storage devices 1722 are directly coupled with the controller 1720, while one or more external memory devices 1723-1724 couple with the controller over external coupling 1730 and/or a distributed network 1732 (e.g., the Internet, an Intranet, a local area network, and other such networks).

The local memory storage device 1722 maintains computer programs 1740, executables 1742, and other software for operating the system 1710. In some embodiments, the one or more query data 1744 is retrieved from memory (e.g., retrieved from a disk drive, retrieved from external memory 1723-1724, or obtained through other similar means). The controller utilizes the query data to generate one or more query slice images 1750 and stores the query slice image(s). Similarly, the controller accesses one or more of the storage devices 1722-1724 to gain access to one or more databases of candidate content 1752-1754. One or more candidate slice images 1756 are generated by the controller, and stored in memory, typically in the local memory device 1722. The one or more query slice images 1750 are compared by the controller 1720 with the one or more candidate slice images 1756. The comparison can be implemented through substantially any image comparison, such as process 1410 as described above, or other comparison techniques. When matches are detected the matching portions 1758 of the candidate data 1760 are recorded in local memory 1722 and reported by the controller to a user through a user interface 1766 (e.g., a display, printed data, and other such user interfaces). The system 1710 also allows user interaction with the system through the user interfaces, such as keyboard, mouse, and other such user interfaces).

Figure 18:
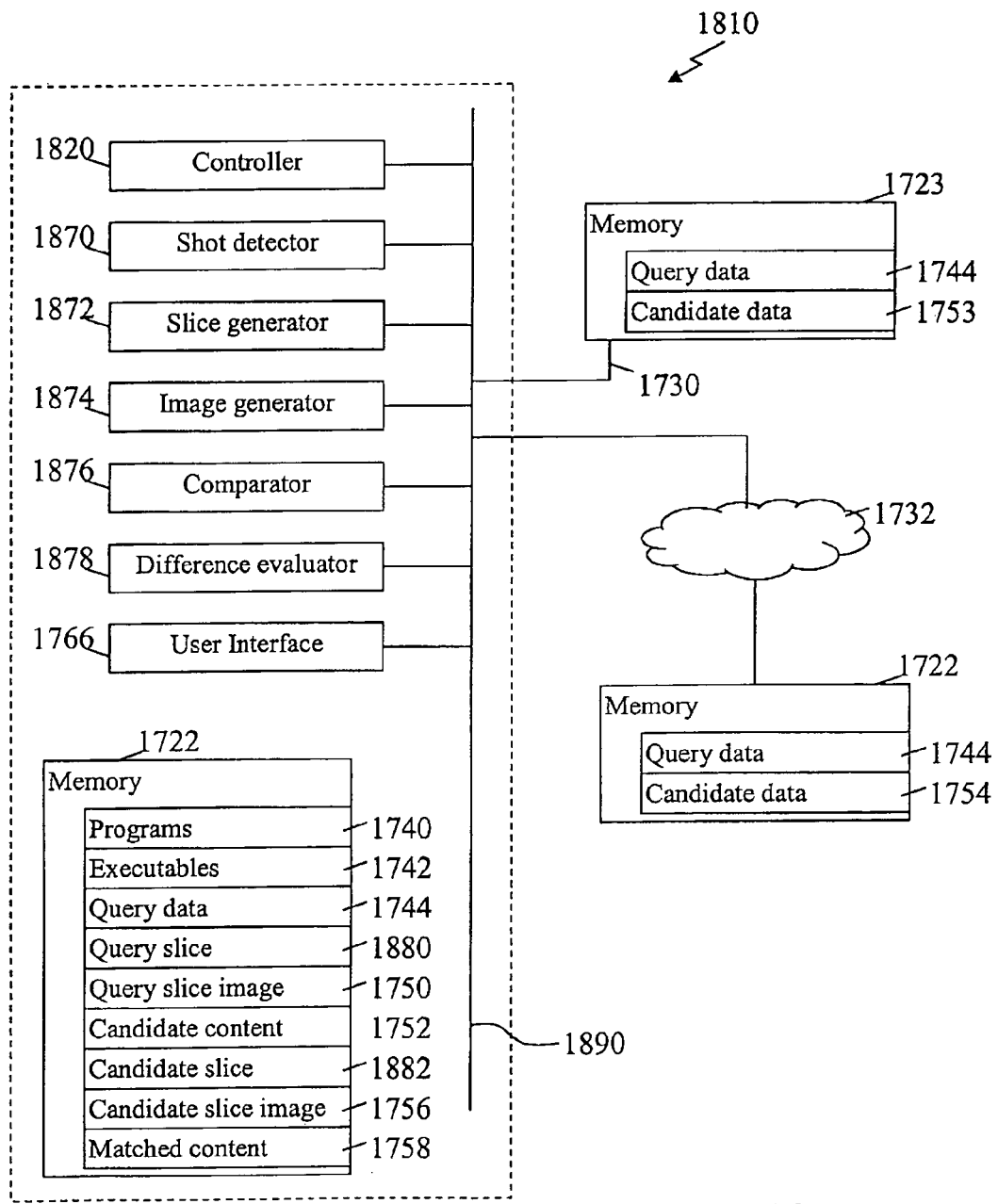
FIG. 18 depicts a simplified block diagram of a system according to some embodiments for use in searching video data.

FIG. 18 depicts a simplified block diagram of a system 1810 according to some embodiments for use in searching video data and other similar content. The system includes a controller 1820, which in some embodiments is similar to the controller 1720 of FIG. 17 and can be implemented through substantially any relevant controller including one or more computers, one or more microprocessors, and other such controllers and/or combinations of controllers. The controller 1820 couples with one or more memory storage devices 1722-1724. The memory devices include one or more local memory storage devices 1722, and one or more external memory devices 1723-1724 couple with the controller 1820 and other components as described fully below over external coupling 1730 and/or a distributed network 1732 (e.g., the Internet, an Intranet, a local area network, and other such networks).

The local memory storage device 1722 maintains computer programs 1740, executables 1742, and other software for operating the system 1810. In some embodiments, the one or more query data 1744 and/or candidate data 1752 is retrieved from memory (e.g., retrieved from a disk drive, retrieved from external memory 1723-1724, or obtained through other means, such as entered by a user).

The system 1810 further includes a shot or scene detector 1870 that is employed to evaluate query data and candidate data to identify shot boundaries and define clips. A spatial slice generator 1872 is further included, and extracts slices from frames of the query and candidate clips to be compared, and stores the slices 1880, 1882, respectively, in local memory and/or forwards the slice data to a two-dimensional slice image generator 1874. In some implementations, the slice generator evaluates the query and/or candidate video data to determine where in the frames the slice should be taken from the frames. For example, in some embodiments, the slice generator initially extracts a plurality of slices from each frame of a limited number of frames distributed over a query clip or the query data (e.g., every $n^{th}$ frame, or random selection of frames, etc.), and compares the corresponding slices from successive frames to determine differences. Based on the extent of measured changes for the different slices over successive frames, a single slice is selected as the slice to be extracted from each frame for the generation of the two-dimensional slice images.

The two-dimensional slice image generator 1874 utilizes the slices 1880, 1882 to generate query and candidate slice images 1750, 1756 and/or extended slice images depending on the implementation of the comparison. In some implementations, the two-dimensional slice image generator utilizes slices from less than all of the frames, and/or utilizes only a portion of the slices in order to provide coarse comparisons and/or to reduce the computational processing.

A comparator 1876 cooperates with the controller to compare at least subsets of the query and candidate slice images for coarse comparison, the query and candidate slice images for a more precise comparison, and/or extended slice images, and returns comparison results. The comparison can be implemented through substantially any image comparison, such as process 1410 as described above, or other comparison techniques. In some implementations, the comparator 1876 uses only limited portions of the query and candidate slice images. For example, the comparator may use just the luminance, just one color, and/or other such limited data from the slice images to provide coarse comparisons and/or reduce computational processing.

A difference evaluator 1878 utilizes the comparison data to identify and record candidate clips that are similar to query clips. When matches are detected the matching portions 1758 of the candidate data 1760 are recorded in local memory 1722 and reported by the controller to a user through a user interface 1766 (e.g., a display, printed data, and other such user interfaces).

The system 1810 also allows user interaction with the system through the user interfaces, such as through keyboard, mouse, and other such user interfaces. A bus or other electronic coupling 1890 is included to provide communication of data and control information between the controller 1820 and the components (e.g., 1722-1724, 1730, 1732, 1870, 1872, 1874, 1876, 1878, etc.), and between the components.

Because of the large amount of data associated with some video and/or other multimedia content, generating two-dimensional static slice images may still result in large amounts of data to be evaluated. For example, with long video sequence and/or high resolution video very large sliced images may result. The present embodiments, however, in some implementations provide coarse and fine comparisons, and/or shot or scene detection to further focus the comparison process. The coarse comparison and/or shot detection comparison allows for reduced computational processing in locating more likely matches with the query data. Once focused, the comparison process then can provide a fine or more precise comparison for those areas identified as potential matches through the coarse comparison if needed.

As discussed above, the coarse comparison can be implemented through any number of relevant comparisons, such as selecting slice data from every $n^{th}$ frame (e.g., every fourth frame), using data from every $n^{th}$ pixel (e.g.:, every fifth pixel), use a subset of the slice, or some other subset of data for the coarse comparison. For example, the coarse comparison is implemented in some embodiments to utilize only luminance. Once areas are identified with luminance comparison as being potential matches, a more refined comparison is performed, such as using additional color data. In many instances, when two images have very different luminance, it is unlikely that the images are similar. Thus, in some luminance comparisons, further color comparisons may not be necessary. Similarly, some implementations utilize just a single color (e.g., just red) instead of luminance, and then perform refine comparisons on any one or more areas determined to be similar. The coarse or rough comparison allows for the comparison of a subset of the data (any relevant part of the data) to filter out portions of the data that could not match. The more precise comparison is then employed when needed with additional and/or more precise data to verify matches and/or filter out non-matches.

Some embodiments allow for enhanced and/or more precise comparisons through the use of extended slice images (e.g., see FIGS. 8-11). Further, the extended slice images can be utilized in some special and/or extreme instances where candidate and/or query data does not include object motion and/or camera motion. In these instances, where a sequence of frames contain the same or substantially the same information for several frames, and/or where motion occurring during a series of frames is positioned outside the area defined by the slice such that slices of these frames include substantially the same data for a plurality of slices, may not provide sufficient data to allow for accurate identification. The extended slice image, however, provides added information due to the inclusion of an entire frame, more than one entire frame, increased slice size and/or other such additional information as discussed above.

The extended slice image, in some embodiment, contains a frame or a portion of a frame as a part of the slice image, providing additional information and/or demonstrating differences for comparison. For example, a video clip, when displayed, may show a house for several frames (e.g., 90 frames, about 3 seconds) and the only movement during these frames is on the far left of the frame (e.g., a tree blowing in the wind), while a vertical slice is taken off center to the right side of each frame, and thus all vertical slices are the same or substantially the same during these 90 frames (because the tree is not part of the slice). In utilizing the extended slice image, an initial frame, for example, is concatenated at the beginning of the slice image showing the house with the tree which is searchable allowing a match to be found in candidate data that includes the position of the tree, along with a known first frame for the clip being searched.

The present embodiments, advantageously utilize changes over time. Instances where changes are not occurring in a slice for several frames is not common, and thus the present embodiment provides improved search capabilities and verification of identified portions of candidate data. Even when changes are small, the present embodiment utilized the differences over time, and thus differences over time are generally significant allowing for accurate comparisons.

The present embodiments further provide simplified and highly reliable method for use in searching video, multimedia and other similar data and/or content. Additionally, present embodiments allow for a simplified system for implementing the present embodiments. The slice extraction, slice image generation and two-dimensional still slice image comparison can be implemented through software, hardware, and/or a combination. In some preferred embodiments, the system for data comparison is implemented substantially through hardware.

Further, because the methods for use in searching video data according to the present embodiments are so relatively simple to implement, systems and/or users can implement searching with no or only minimal training. Alternatively, other comparison methods require significant training, e.g., key frame selection, feature selection, and other such processes require relatively significant training to implement. For example, with key frame selection, a system is trained in order to accurately select frames and/or feature to be use in the search, as well as how to select these frames and implement the search process (e.g., user of key frame detection typically need to understand the search algorithms utilized in order to select accurate key frames).

Additionally, the present embodiments are more comprehendible and/or intuitive, at least in part, because of the use of two-dimensional slice images. Slice images are visible (and/or displayable), and can allow a user to personally do a visual comparison. The slice images are more understandable and/or can be visually understood by a user. Similarly, the user can easily compare visually the displayed query and candidate slice images. Alternatively, other comparative methods utilize abstract theories that are relatively difficult to understand. Two-dimensional static slice images produced and used by the present embodiments are visible and more readily understood by a user.

As discussed above, the present methods and systems for use in searching video, multimedia and other such data have many applications. Some examples of applications include video retrieval (library of videos, internet, search engine), authentication, better video compression (knowing two videos are similar, the video compression ratio can be very high), pre-processing of clips to estimate an amount of change in a clip and/or scene to anticipate compression ratios, automatic DVD chapter point creation, DVD authoring, video editing, scene searching and allowing identifying removal of scenes as user shifts through scenes, creating indexes for points or transitions in clips, identifying chapter points, and substantially any application when attempting to find a similar video, commercial detection, and other such applications. A chapter point generally is a marker in DVD/VCD video streams that typically delineates content and allows indexing into content. Chapter points let viewers, systems and/or applications to navigate to specific locations in video. In some implementations, users manually insert chapter points by viewing changes in content in a preview mode. In some cases the chapter points are just set at periodic intervals, for example every 5 minutes, in content for equal jump points. In some more automated methods the time codes of the original video are use to find discontinuous breaks in time to determine scene transitions or chapter points. The present embodiments providing video searching, in some applications, simplify the generation of chapter points, and further provide precise positioning of the chapter points, by allowing devices employing the present embodiments (e.g., DVD/VCD products) to find specific video scenes and set chapter points automatically by processing a video clip. For example, the specific scenes can be parsed out and they may include detecting scene breaks for commercials from TV station broadcast video.

The present embodiments can be utilized with many other products, such as video compression machines, video editing machines, substantially any video editing and/or authoring products (such as many products from Sonic Solutions™ including, but not limited to, MyDVD®, DVDit!®, AuthorScript, Sonic Scenarist®, DVD Creator®, and other products), other video related products such as MovieMaker from Microsoft®, Adobe Premier, Pinnacle Studio, and other such products, and many other professional, business and consumer products. Further, the video searching provided by the present embodiments can similarly be used with medial image/video searching, traffic surveillance video searching, internet video searching, interact television applications, and other such searching and/or applications.

While the invention herein disclosed has been described by means of specific embodiments and applications thereof, numerous modifications and variations could be made thereto by those skilled in the art without departing from the scope of the invention set forth in the claims.

What is claimed is:

1. A method for use in searching video data, comprising:
   extracting a spatiotemporal representation of at least a portion of a query sequence of video data;
   producing a two-dimensional spatiotemporal query slice image from the spatiotemporal representation of at least the portion of the query sequence;
   extracting a spatiotemporal representation of at least a portion of candidate video data;
   producing a two-dimensional spatiotemporal candidate slice image from the spatiotemporal representation of at least the portion of the candidate video data;
   determining when the query slice image matches at least a portion of the candidate slice image; and
   wherein the extracting of the spatiotemporal representation and producing the query slice image comprises extracting a slice of query data from each of a plurality of frames of at least the portion of the query sequence.

2. The method of claim 1, further comprising:
   comparing the query slice image with at least the portion of the candidate slice image and providing a comparison result; and
   the determining when the query slice image matches at least the portion of the candidate slice image comprises determining when the comparison result at least meets a threshold.

3. The method of claim 1, wherein the producing the query slice image comprises concatenating each of the slices of query data from each of the plurality of frames.

4. The method of claim 1, wherein the producing the query slice image comprises generating a two-dimensional query slice image; and
   the producing the candidate slice image comprises generating a two-dimensional candidate slice image.

5. The method of claim 4, further comprising:
   performing an image comparison comparing the two-dimensional query slice image and at least the portion of the two-dimensional candidate slice image;
   determining a difference between the two-dimensional query slice image and at least the portion of the two-dimensional candidate slice image; and
   the determining when the query slice image matches at least the portion of the candidate slice image comprises determining when the difference is less than a threshold.

6. The method of claim 1, further comprising:
   defining a first shot boundary in the query sequence;
   identifying first and second shot sequences relative to the first shot boundary; and
   the extracting the spatiotemporal representation of at least the portion of the query sequence comprises extracting the spatiotemporal representation of at least one of the first and second shot sequences.

7. The method of claim 1, further comprising:
   extracting a coarse query slice image from the query slice image;
   extracting a coarse candidate slice image from the candidate slice image; and
   the determining when the query slice image matches at least a portion of the candidate slice image comprises performing a coarse comparison between the coarse query slice image and the coarse candidate slice image.

8. The method of claim 7, wherein the determining when the query slice image matches at least a portion of the candidate slice image further comprises:
   identifying a matched portion of the coarse candidate slice image that matches the coarse query slice image;
   identifying a matched portion of the candidate slice image associated with the matched portion of the coarse candidate slice image;
   determining a difference between the query slice image to the matched portion of candidate slice image; and
   identifying that a match exists when the difference is less than a threshold.

9. A method for use in searching video data, comprising:
   extracting a query slice of query data from each of a plurality of frames of a query sequence of video data;
   generating a two-dimensional query slice image comprising the extracted query slice data of all the plurality of frames of the query sequence;
   extracting a candidate slice of candidate data from each of a plurality of frames of a candidate sequence of video data;
   generating a two-dimensional candidate slice image comprising the extracted candidate data of all the plurality of frames of the query sequence; and
   comparing the query slice image and the candidate slice image.

10. The method of claim 9, wherein the comparing the query slice image and the candidate slice image comprises generating a comparison result; and
    identifying a portion of the candidate date as being similar to at least a portion of the query data when the comparison results meet a first threshold.

11. The method of claim 10, wherein the comparing comprises determining a difference between the query slice image and the candidate slice image such that the comparisons results is the difference; and
    the identifying comprises identifying when the difference between the query slice image and the candidate slice image is less than the first threshold.

12. The method of claim 9, wherein the comparing comprises performing a coarse comparison of the query slice image and the candidate slice image.

13. The method of claim 12, wherein the comparing further comprises performing a more precise comparison of the query slice image and the candidate slice image.

14. The method of claim 9, wherein the generating the two-dimensional query slice image comprises generating an extended query slice image.

15. The method of claim 14, further comprising:
extracting a frame of query data; and
the generating the extended query slice image comprises concatenating the frame of query slice data and the query slice of query data from each of the plurality of frames of the query sequence of video data.

16. The method of claim 15, further comprising:
defining a shot boundary within the query sequence of video data; and
the extracting the frame of query data comprises extracting the frame of query data directly following the shot boundary.

17. An apparatus for use with video data, comprising:
a memory storing candidate video data comprising a plurality of frames and a query sequence comprising a plurality of frames;
a slice generator coupled with the memory to retrieve at least a portion of the candidate video data and the query sequence, and the slice generator extracts a candidate slice of candidate date from a plurality of the frames of the candidate video data and further extracts a query slice of candidate date from a plurality of the frames of the query sequence; and
a two-dimensional image generator coupled to receive the candidate slices and the query slices, and the two-dimensional image generator generates a candidate slice image by combining the received candidate slices and a query slice image by combining the received query slices.

18. The apparatus of claim 17, further comprising:
a comparator coupled with memory to receive the query slice image and the candidate slice image, and to compare at least a subset of the query slice image with at least a subset of the candidate slice image.

19. The apparatus of claim 18, further comprising:
a difference evaluator cooperated with the comparator, where the difference evaluator evaluates the comparison between the at least the subset of the query slice image with the at least the subset of the candidate slice image and determines whether a portion of the at least the subset of the candidate slice image matches the at least the subset of the query slice image.

20. The apparatus of claim 19, further comprising:
a shot detector coupled with the memory to identify shot boundaries of at least the portion of the candidate video data and the query sequence.

21. The apparatus of claim 20, wherein the image generator further couples with the shot detector, such that the image generator extracts additional frame information from a frame directly following a shot boundary of at least a portion of the candidate video data and extracts additional frame information from a frame directly following a shot boundary of the query sequence, and incorporates the additional frame information from the candidate video data into the candidate slice image and incorporates the additional information from the query sequence into the query slice image.

* * * * *

UNITED STATES PATENT AND TRADEMARK OFFICE
CERTIFICATE OF CORRECTION

PATENT NO. : 7,376,274 B2  
APPLICATION NO. : 10/931612  
DATED : May 20, 2008  
INVENTOR(S) : Xiong It is certified that error appears in the above-identified patent and that said Letters Patent is hereby corrected as shown below:

On the FACE PAGE:
Under OTHER PUBLICATIONS Item (56), column 2, line 7, please delete "andW. Xiong." and insert --and W. Xiong,--.

In the CLAIMS:
Claim 6, column 22, line 9, before "extracting" delete "the".
Claim 10, column 22, line 52, delete "candidate date" and insert --candidate data--.
Claim 17, column 23, lines 23 and 25, delete "candidate date" and insert --candidate data--.

Signed and Sealed this

Twenty-fifth Day of November, 2008

JON W. DUDAS  
*Director of the United States Patent and Trademark Office*